United States Patent
Garlepp

(10) Patent No.: US 7,336,749 B2
(45) Date of Patent: Feb. 26, 2008

(54) STATISTICAL MARGIN TEST METHODS AND CIRCUITS

(75) Inventor: Bruno W. Garlepp, San Jose, CA (US)

(73) Assignee: Rambus Inc., Los Altos, CA (US)

( * ) Notice: Subject to any disclaimer, the term of this patent is extended or adjusted under 35 U.S.C. 154(b) by 700 days.

(21) Appl. No.: 10/849,264

(22) Filed: May 18, 2004

(65) Prior Publication Data
US 2005/0259774 A1 Nov. 24, 2005

(51) Int. Cl.
*H04L 7/00* (2006.01)
(52) U.S. Cl. ................................... 375/355
(58) Field of Classification Search ........... 375/224, 375/232, 354–355, 362, 371; 714/724, 738; 327/7, 9, 91, 96
See application file for complete search history.

(56) References Cited

U.S. PATENT DOCUMENTS

| | | | |
|---|---|---|---|
| 3,895,349 A | 7/1975 | Robson | |
| 4,449,102 A | 5/1984 | Frazer | |
| 4,475,210 A | 10/1984 | Couch | 375/224 |
| 4,695,969 A | 9/1987 | Sollenberger | 708/323 |
| 4,727,540 A | 2/1988 | Lacroix et al. | 370/522 |
| 4,823,026 A * | 4/1989 | Hanson | 327/95 |
| 5,197,062 A | 3/1993 | Picklesimer | |
| 5,228,042 A | 7/1993 | Gauthier et al. | 714/716 |
| 5,325,397 A | 6/1994 | Scholz et al. | |
| 5,331,663 A | 7/1994 | Kurokami | 375/14 |
| 5,369,755 A | 11/1994 | Berkovich | 710/100 |
| 5,459,762 A | 10/1995 | Wang et al. | 375/336 |
| 5,475,710 A | 12/1995 | Ishizu et al. | 375/232 |
| 5,483,676 A | 1/1996 | Mahany et al. | 455/67.14 |
| 5,732,089 A | 3/1998 | Negi | 714/704 |
| 5,761,212 A | 6/1998 | Foland et al. | 714/719 |
| 5,761,216 A | 6/1998 | Sotome et al. | 714/738 |
| 5,802,073 A | 9/1998 | Platt | 714/733 |
| 5,917,856 A | 6/1999 | Torsti | 375/231 |
| 5,949,819 A | 9/1999 | Bjarnason et al. | 375/222 |

(Continued)

FOREIGN PATENT DOCUMENTS

DE 199 14 793 A1 10/2000

(Continued)

OTHER PUBLICATIONS

Maxfield, Clive, "The Ouroboros of the Digital Consciousness: Linear-Feedback-Shift Registers." EDN—Design Feature, Jan. 4, 1996. pp. 135-138, 140, and 142.

(Continued)

*Primary Examiner*—Khanh Tran
(74) *Attorney, Agent, or Firm*—Silicon Edge Law Group LLP; Arthur J. Behiel

(57) ABSTRACT

Margin-testing circuits and methods rely upon the statistics of sampled data to explore the margin characteristics of received data. One margining circuit samples an incoming data stream N times at each of many sample points, each sample point representing a unique sample voltage, unique sample timing, or a unique combination of sample voltage and sample timing. The number of ones sampled at a particular point is a measure of the ones probability for that sample point. The ones probabilities for the collection of unique sample points are then analyzed to measure various aspects of the received data stream, including the data margin.

24 Claims, 18 Drawing Sheets

U.S. PATENT DOCUMENTS

| | | | | |
|---|---|---|---|---|
| 5,999,022 | A | 12/1999 | Iwata et al. | 327/112 |
| 6,003,118 | A | 12/1999 | Chen | 711/167 |
| 6,055,297 | A | 4/2000 | Terry | 379/1.01 |
| 6,154,659 | A | 11/2000 | Jalali et al. | 455/522 |
| 6,160,790 | A | 12/2000 | Bremer | 370/201 |
| 6,222,380 | B1 | 4/2001 | Gerowitz et al. | 326/38 |
| 6,230,022 | B1 | 5/2001 | Sakoda et al. | 455/522 |
| 6,289,045 | B1 | 9/2001 | Hasegawa et al. | 375/231 |
| 6,292,116 | B1 | 9/2001 | Wang et al. | 341/100 |
| 6,295,152 | B1 | 9/2001 | Wedding | |
| 6,331,787 | B1 | 12/2001 | Whitworth et al. | 326/30 |
| 6,339,387 | B1 | 1/2002 | Koga | 341/100 |
| 6,378,079 | B1 | 4/2002 | Mullarkey | 713/401 |
| 6,421,801 | B1 | 7/2002 | Maddux et al. | 714/744 |
| 6,430,715 | B1 | 8/2002 | Myers et al. | |
| 6,493,394 | B2 | 12/2002 | Tamura et al. | |
| 6,606,041 | B1 | 8/2003 | Johnson et al. | 341/120 |
| 6,631,486 | B1 | 10/2003 | Komatsu et al. | 714/724 |
| 6,650,698 | B1 | 11/2003 | Liau et al. | 375/229 |
| 6,671,847 | B1 | 12/2003 | Chao et al. | 714/744 |
| 6,674,998 | B2 | 1/2004 | Prentice | 455/114.2 |
| 6,907,065 | B2 | 6/2005 | Kim | 375/233 |
| 7,184,477 | B2 | 2/2007 | Haunstein et al. | 375/233 |
| 7,188,261 | B1 | 3/2007 | Tobias et al. | 713/300 |
| 2001/0016929 | A1 | 8/2001 | Bonneau et al. | 714/735 |
| 2001/0021987 | A1 | 9/2001 | Govindarajan et al. | 714/705 |
| 2002/0044618 | A1 | 4/2002 | Buchwald | 375/355 |
| 2002/0060820 | A1 | 5/2002 | Buchali | 398/202 |
| 2002/0073373 | A1* | 6/2002 | Nakao et al. | 714/738 |
| 2002/0085656 | A1 | 7/2002 | Lee | 375/355 |
| 2002/0131531 | A1 | 9/2002 | Matsumoto | 375/340 |
| 2002/0138800 | A1* | 9/2002 | Kim et al. | 714/719 |
| 2002/0196883 | A1 | 12/2002 | Best | 375/355 |
| 2003/0088818 | A1* | 5/2003 | Manning | 714/724 |
| 2003/0223489 | A1 | 12/2003 | Smee | 375/233 |
| 2005/0259726 | A1* | 11/2005 | Farjad-rad | 375/232 |

FOREIGN PATENT DOCUMENTS

| | | |
|---|---|---|
| DE | 102 41 848 A1 | 3/2004 |
| EP | 1 127 423 A0 | 8/2001 |
| EP | 1 134 668 A2 | 9/2001 |
| EP | 1 143 654 A2 | 10/2001 |
| EP | 1 315 327 A2 | 5/2003 |
| WO | WO 00/27065 | 5/2000 |
| WO | WO 02093821 | 11/2002 |

OTHER PUBLICATIONS

Pfaff, Andreas, "Test High-Speed Drivers with Bursts and Pseudo-random Bit Patterns." EDN—Design Feature, May 12, 1994. pp. 133, 134 and 136.

Klein, Bob, "Use LFSRs to Build Fast FPGA-Based Counters." Electronic Design, Mar. 21, 1994. pp. 87, 88, 90, 94, 96, 97 and 100.

Soumyanath, K. et al., "Accurate On-Chip Interconnect Evaluation: A Time-Domain Technique." IEEE Journal of Solid-State Circuits, vol. 34, No. 5, May 1999. pp. 623-631.

Dally, William J. et al., "Multi-Gigabit Signaling with CMOS." This work supported under DARPA Contract No. DABT63-96-C-0039, May 12, 1997. pp. 1-21 and 5 additional not number pages.

"HOTLink™ Built-In Self-Test (BIST)." Cypress Semiconductor Corporation, Mar. 11, 1999. Cover page, pp. 1-12, and 1 page.

Sato, Takashi, "Accurate In Situ Measurement of Peak Noise and Delay Change Induced by Interconnect Coupling." IEEE Journal of Solid-State Circuits, vol. 36, No. 10, Oct. 2001. pp. 1587-1591.

Cova, Sergio D. et al., "Characterization of Individual Weights in Transversal Filters and Application to CCD's." IEEE Journal of Solid-State Circuits, vol. SC-17, No. 6, Dec. 1982. pp. 1054-1061.

Farber, A.S., "Wide-Band Network Characterization by Fourier Transformation of Time-Domain Measurements." IEEE Journal of Solid-State Circuits, vol. Sc-4, No. 4, Aug. 1969. pp. 231-235.

Ikawa, Yasuo, "Modeling of High-Speed, Large-Signal Transistor Switching Transients from s-Parameter Measurements." IEEE Journal of Solid-State Circuits, vol. Sc-17, No. 2, Apr. 1982. pp. 299-305.

Horowitz, Mark, "Lecture 15: Transmitter and Receiver Design." Computer Systems Laboratory—Stanford University. Copyright 2000. pp. 15-1 to 15-35.

Granberg, Tom, "Handbook of Digital Techniques for High-Speed Design." Prentice Hall Modern Semiconductor Design Series. Copyright 2004 by Pearson Education, Inc. 12 pgs.

Ellermeyer, Tobias et al., "A 10-Gb/s Eye-Opening Monitor IC for Decision-Guided Adaptation of the Frequency Response of an Optical Receiver." IEEE Journal of Solid-State Circuits, vol. 35, No. 12, Dec. 2000. pp. 1958-1963.

"SHMOO User's Guide." 500 Semiconductor Production Test System. Copyright © 1998-2001, LMO Test Systems, Inc. Last Revised: Apr. 2001. Cover, Table of Contents, pp. 1-28.

Granberg, Tom, "Handbook of Digital Techniques for High-Speed Design." Prentice Hall Modern Semiconductor Design Series. Copyright 2004 by Pearson.

U.S. Appl. No. 10/441,461, filed May 20, 2003, Chen.

U.S. Appl. No. 10/815,604, filed Mar. 31, 2004, Ho et al.

Alfke, Peter "Efficient Shift Registers, LFSR Counters, and Long Pseudo-Random Sequence Generators." Xilinx Application Note, XAPP 052, (version 1.1), Jul. 7, 1996. 6 pages.

Christoph M. Degen, Christoph M. Walke, and Bernard Rembold. "Comparative Study of Efficient Decision-Feedback Equalization Schemes for MIMO Systems." Presented on Feb. 2002. 7 pages. Institute of High Frequency Technology, RWTH Aachen, Germany.

John Koeter. "What's an LFSR?" Texas Instruments, SCTA036A. Dec. 1996. 2 cover pages, pages iiiii-iv, pp. 1-7.

Heider N. Ereifej, Ronald Holzlohner, Gary M. Carter, and Curtis R. Menyuk. "Intersymbol Interference and Timing Jitter Measurements in a 40-Gb/s Long-Haul Dispersion-Managed Soliton System." IEEE Photonics Technology Letters, vol. 14, No. 3, Mar. 2002. pp. 343-345.

Rajarshi Gupta, Kiran, Edward A. Lee, "Computationally Efficient Version of the Decision Feedback Equalizer." Sep. 1998. 4 pages.

Stojanovic, Vladmir et al., "Modeling and Analysis of High-Speed Links". Research supported by the MARCO Interconnect Focus Center and Rambus, Inc. 2003. 8 pages.

Malik D. Augeh, Joseph M. Kanh and John R. Barry. "Decision-Feedback Equalization of Pulse-Position Modulation on Measured Nondirected Indoor Infrared Channels." IEEE Transactions on Communications, vol. 47, No. 4, Apr. 1999. pp. 500-503.

* cited by examiner

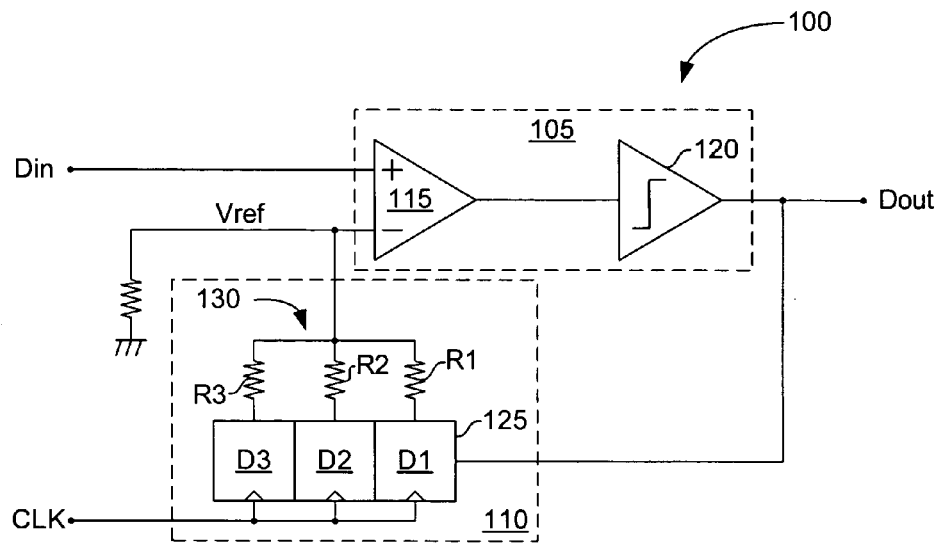
FIG. 1 (PRIOR ART)
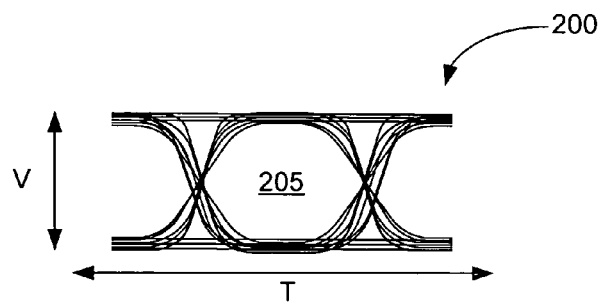
FIG. 2 (PRIOR ART)
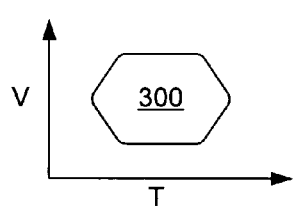   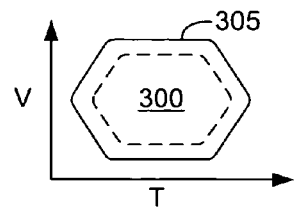   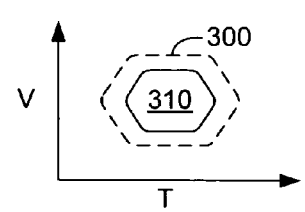
FIG. 3A          FIG. 3B          FIG. 3C

| Vref(14) | 10K | 10K | 10K | 10K | 10K | 10K | 10K | 10K | 10K | 10K | 10K | 10K | 10K | 10K | 10K |
|---|---|---|---|---|---|---|---|---|---|---|---|---|---|---|---|
| | 9988 | 9989 | 9993 | 9985 | 9997 | 9979 | 9984 | 9995 | 9983 | 9996 | 9978 | 9989 | 9991 | 9994 | 9988 |
| | 8747 | 8746 | 8764 | 7506 | 7494 | 7507 | 7505 | 7519 | 7493 | 7498 | 7476 | 8739 | 8771 | 8755 | 8728 |
| | 7495 | 7508 | 6229 | 6234 | 5048 | 5020 | 5048 | 5045 | 5007 | 5011 | 6234 | 6258 | 7506 | 7480 | 7494 |
| | 7498 | 7507 | 6249 | 5024 | 5028 | 4992 | 5023 | 4979 | 5008 | 5014 | 5005 | 6246 | 7511 | 7524 | 7522 |
| | 7487 | 6253 | 5041 | 5022 | 4981 | 4975 | 5007 | 5017 | 5005 | 4994 | 5022 | 5022 | 6270 | 7513 | 7500 |
| | 6255 | 5005 | 5014 | 5021 | 5014 | 4988 | 5013 | 5003 | 5022 | 5008 | 5003 | 5002 | 5037 | 6259 | 7503 |
| | 5014 | 5008 | 4989 | 4976 | 4979 | 5016 | 5010 | 4992 | 5019 | 5001 | 4981 | 4992 | 5002 | 4990 | 5009 |
| | 3761 | 4992 | 4967 | 5023 | 4988 | 5011 | 5003 | 5014 | 4987 | 4998 | 5017 | 4990 | 4972 | 3756 | 2514 |
| | 2477 | 3765 | 4968 | 4981 | 4999 | 5011 | 5000 | 5008 | 5025 | 4994 | 4951 | 4977 | 3750 | 2508 | 2479 |
| | 2509 | 2480 | 3730 | 4988 | 4975 | 5018 | 4981 | 5024 | 4981 | 4991 | 4964 | 3748 | 2512 | 2516 | 2479 |
| | 2505 | 2491 | 3767 | 4959 | 4975 | 4975 | 4999 | 4962 | 4953 | 4981 | 3774 | 3765 | 2511 | 2478 | 2487 |
| | 1243 | 1220 | 1205 | 2500 | 2519 | 2512 | 2485 | 2498 | 2512 | 2479 | 2495 | 1212 | 1241 | 1217 | 1206 |
| | 22 | 5 | 25 | 19 | 14 | 25 | 25 | 22 | 18 | 23 | 11 | 19 | 18 | 21 | 18 |
| Vref(0) | 0 | 0 | 0 | 0 | 0 | 0 | 0 | 0 | 0 | 0 | 0 | 0 | 0 | 0 | 0 |
| | T(0) | | | | | | | | | | | | | | T(14) |

STATISTICAL MARGIN TEST METHODS AND CIRCUITS

BACKGROUND

Signal distortion limits the sensitivity and bandwidth of any communication system. A form of distortion commonly referred to as "intersymbol interference" (ISI) is particularly problematic and is manifested in the temporal spreading and consequent overlapping of individual pulses, or "symbols." Severe ISI prevents receivers from distinguishing symbols and consequently disrupts the integrity of received signals.

FIG. 1 (prior art) depicts a conventional receiver 100, which is used here to illustrate the ISI problem and a corresponding solution. Receiver 100 includes a data sampler 105 and a feedback circuit 110. Sampler 105 includes a differential amplifier 115 connected to a decision circuit 120. Decision circuit 120 periodically determines the probable value of signal Din and, based on this determination, produces a corresponding output signal Dout.

Sampler 105 determines the probable value of signal Din by comparing the input signal Din to a voltage reference Vref at a precise instant. Unfortunately, the effects of ISI depend partly on the transmitted data pattern, so the voltage level used to express a given logic level varies with historical data patterns. For example, a series of logic zero signals followed by a logic one signal produces different ISI effects than a series of alternating ones and zeroes. Feedback circuit 110 addresses this problem using a technique known as Decision Feedback Equalization (DFE), which produces a corrective feedback signal that is a function of received historical data patterns.

DFE feedback circuit 110 includes a shift register 125 connected to the inverting input of amplifier 115 via a resistor ladder circuit 130. In operation, receiver 100 receives a series of data symbols on an input terminal Din, the non-inverting input terminal of amplifier 115. The resulting output data Dout from sampler 105 is fed back to shift register 125, which stores the prior three output data bits. (As with other designations herein, Din and Dout refer to both signals and their corresponding nodes; whether a given designation refers to a signal or a node will be clear from the context.)

Shift register 125 includes a number of delay elements, three flip-flops D1-D3 in this example, that apply historical data bits to the reference voltage side of the differential amplifier 115 via respective resistors R1, R2, and R3. The value of each resistor is selected to provide appropriate weight for the expected effect of the corresponding historical bit. In this example, the value of resistor R3 is high relative to the value of resistor R1 because the effect of the older data (D3) is assumed to be smaller than the effect of the newer data (D1). For the same reason, the resistance of resistor R2 is between the resistors R1 and R3. Receiver 100 includes a relatively simple DFE circuit for ease of illustration: practical DFE circuits may sample more or fewer historical data values. For a more detailed discussion of a number of receivers and DFE circuits, see U.S. Pat. No. 6,493,394 to Tamura et al., issued Dec. 10, 2002, which is incorporated herein by reference.

The importance of accurate data reception motivates receiver manufacturers to characterize carefully their system's ability to tolerate ISI and other types of noise. One such test, a so-called "margin" test, explores the range of voltage and/or timing values for which a given receiver will properly recover input data.

FIG. 2 depicts a fictional eye pattern 200 representing binary input data to a conventional receiver. Eye pattern 200 is graphed in two dimensions, voltage V and time T. The area of eye 205 represents a range of reference voltages and timing parameters within which the data represented by eye 205 will be captured. The degree to which the voltage V and time T of the sampling point can vary without introducing an error is termed the "margin."

FIGS. 3A through 3C depict three signal eyes 300, 305, and 310 illustrating the effects of DFE on margins and margin testing. Referring first to FIG. 3A, eye 300 approximates the shape of eye 205 of FIG. 2 and represents the margin of an illustrative receiver in the absence of DFE. FIG. 3B represents the expanded margin of the same illustrative receiver adapted to include DFE: the DFE reduces the receiver's ISI, and so extends the margins beyond the boundaries of eye 300. Increasing the margins advantageously reduces noise sensitivity and improves bit error rates (BER).

In-system margin tests for a receiver are performed by monitoring receiver output data (e.g., Dout in FIG. 1) while varying the reference voltage and sample timing applied to the input waveform Din. With reference to FIG. 2, such testing samples various combinations of voltage and time to probe the boundaries of eye 205, the boundaries being indicated when the output data does not match the input data. Margin tests thus require the receipt of erroneous data to identify signal margins. Zerbe et al. detail a number of margin tests in "Method and Apparatus for Evaluating and Calibrating a Signaling System," U.S. Pat. No. 6,873,939, which is incorporated herein by reference.

A particular difficulty arises when determining the margins of DFE-equipped receivers. While feeding back prior data bits increases the margin (FIG. 3B), the effect is just the opposite if the feedback data is erroneous. Erroneous feedback emphasizes the ISI and consequently reduces the margin, as shown in FIG. 3C. The margin of a DFE-equipped receiver thus collapses when a margin test begins to probe the limits of the test signal (e.g., the boundaries of eye 205). The incompatible requirements of erroneous data for the margin test and correct data for the DFE thus impede margin testing. There is therefore a need for improved means of margin testing DFE-equipped receivers.

The need for accurate margin testing is not limited to DFE-equipped receivers. Errors in margin testing lead integrated-circuit (IC) designers to specify relatively large margins of error, or "guard bands," to ensure that their circuits will perform as advertised. Unfortunately, the use of overly large margins reduces performance, an obvious disadvantage in an industry where performance is paramount. There is therefore a need for ever more precise methods and circuits for accurately characterizing the margins of high-speed circuits.

SUMMARY

The present disclosure is directed to methods and circuits for margin testing high-speed receivers. Some embodiments equipped with Decision Feedback Equalization (DFE) or other forms of feedback that employ historical data to reduce inter-symbol interference (ISI) perform margin tests using a known input data stream. The receiver injects a copy of the known input data stream (i.e., the "expected data") into the feedback path irrespective of whether the receiver correctly interprets the input data. The margins are therefore maintained in the presence of receiver errors, allowing in-system margin tests to probe the margin boundaries without collapsing the margin. Receivers in accordance with some embodiments include local sources of expected data.

Other embodiments do not rely on "expected data," but can be margin tested in the presence of any pattern of received data. These embodiments are particularly useful for in-system margin testing. Also important, such systems can be adapted to dynamically alter system parameters during device operation to maintain adequate margins despite fluctuations in the system noise environment due to e.g. temperature and supply-voltage changes.

Also described are methods of plotting and interpreting error data generated by the disclosed methods and circuits. One embodiment generates shmoo plots graphically depicting the results of margin tests. Some embodiments filter error data to facilitate pattern-specific margin testing.

Still other margin-testing circuits and methods described herein rely upon probabilistic sampled data to explore the margin characteristics of received data. In one embodiment, for example, a margining circuit samples an incoming data stream N times at each of many data points. Each data point represents a unique sample voltage, a unique sample timing, or a unique combination of sample voltage and sample timing in relation to the incoming data. The number of ones sampled at a particular point is a measure of the ones density, or ones probability, for that sample point in V/T space. The ones probabilities for the collection of unique sample points are then analyzed to measure various aspects of the received data stream, including the receiver margin.

This summary does not limit the invention, which is instead defined by the allowed claims.

BRIEF DESCRIPTION OF THE FIGURES

FIG. 1 (prior art) depicts a conventional digital receiver 100.

FIG. 2 depicts a fictional eye pattern 200 representing binary input data to a conventional receiver.

FIGS. 3A through 3C depict three signal eyes 300, 305, and 310 illustrating the effects of DFE on margins and margin testing.

DETAILED DESCRIPTION

Figure 4:
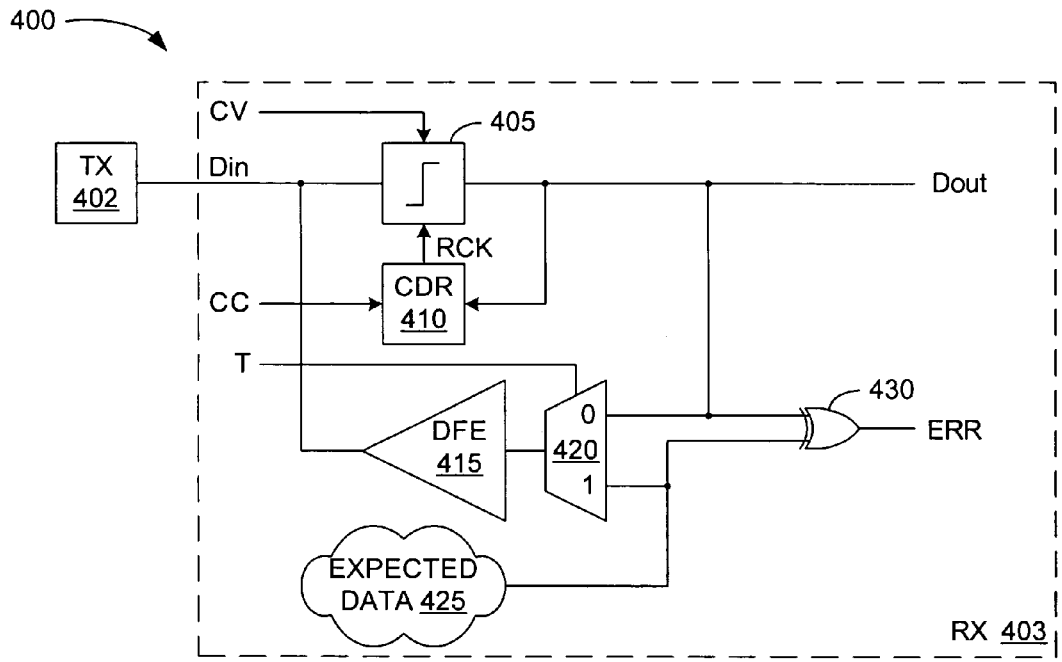
FIG. 4 depicts a communication system 400, including a conventional transmitter 402 connected to a DFE-equipped receiver 403 adapted in accordance with one embodiment.

FIG. 4 depicts a communication system 400, including a conventional transmitter 402 connected to a receiver (receive circuit) 403 equipped with Decision Feedback Equalization (DFE). In a normal operational mode, receiver 403 samples an input data stream from transmitter 402. The sampled data provides DFE feedback to reduce intersymbol interference (ISI). In a margin-test mode, receiver 403 samples a known input data stream using ranges of sample timing and reference voltages. To prevent a collapse of the margins, the DFE feedback path disregards the potentially erroneous sampled data in favor of an identical version of the known input data stream. In-system margin tests can therefore probe the margin without collapsing the margin limits.

Receiver 403 conventionally includes a sampler 405, an optional clock-and-data recovery (CDR) circuit 410, and a DFE circuit 415. During normal operation, receiver 403 receives a data stream (e.g., a series of data symbols) on sampler input terminal Din. Sampler 405 samples the data stream using a recovered clock RCK from CDR circuit 410 and produces the resulting sampled data stream on a sampler output terminal Dout. DFE circuit 415 stores a plurality of prior data samples and uses these to condition the input data in the manner discussed above in connection with FIG. 1. In addition to the conventional components, receiver 403 includes a multiplexer 420, an expected-data source 425, and some comparison logic 430, in this case an exclusive OR (XOR) gate.

During normal operation, a test control signal T to multiplexer 420 is set to a logic zero to connect the output data Dout to the input of DFE 415. Thus configured, receiver 403 acts as a conventional DFE-equipped receiver. In a margin-test mode, however, select signal T is set to a logic one so as to convey an expected data stream from data source 425 to the input of DFE 415. Transmitter 402 then supplies known test data on terminal Din while the expected data is applied to DFE 415. The expected data is an identical, time-shifted version of the known data applied to input terminal Din, so DFE 415 produces the correct feedback without regard to the output signal Dout. In essence, multiplexer 420 provides the feedback path with a first input terminal for sampled output data in the operational mode and with a second input terminal for expected data in the margin-test mode.

The repeated reference herein to "terminal" Din, as opposed to the plural form "terminals," is for brevity. Receivers may include more than one data-input terminal, such as those that rely upon differential signaling. Likewise, other clock, reference, and signal paths noted herein can be single-ended, differential, etc., as will be evident to those of skill in the art. The preferred manner in which particular test circuits and methods are adapted for use with a given receiver will depend, in part, on the receiver architecture.

A voltage control signal CV on a like-named sampler input terminal alters the reference voltage used by sampler 405 to sample input data. A clock control signal CC to CDR circuit 410 modifies the timing of recovered clock signal RCK. Control signals CV and CC are used in margin testing to explore the voltage and timing margins of receiver 403. When the margin tests reach the margin limits, and thus introduce errors in output signal Dout, expected-data source 425 continues to provide the correct DFE feedback signal and consequently prevents the margins from collapsing in response to the errors. Comparison circuit 430 monitors the sampled-data series for errors by comparing the output data with the expected data from expected-data source 425. In the event of a mismatch, comparison circuit 430 produces a logic one error signal ERR. A sequential storage element (not shown) captures any error signal. Receiver 403 thus facilitates margin testing of DFE-equipped receivers without collapsing the margin of interest. (Error signal ERR may or may not be monitored in the operational mode.)

Expected-data source 425 produces the same data as expected on input terminal Din. Source 425 can be a register in which is previously stored a known data pattern to be provided during margin testing. Source 425 might also be a register that goes through an expected sequence of data, such as a counter or a linear-feedback shift register (LFSR). Regardless of the source, the expected data presents the expected output data, appropriately timed, to the input of the feedback circuit DFE 415.

Figure 5:
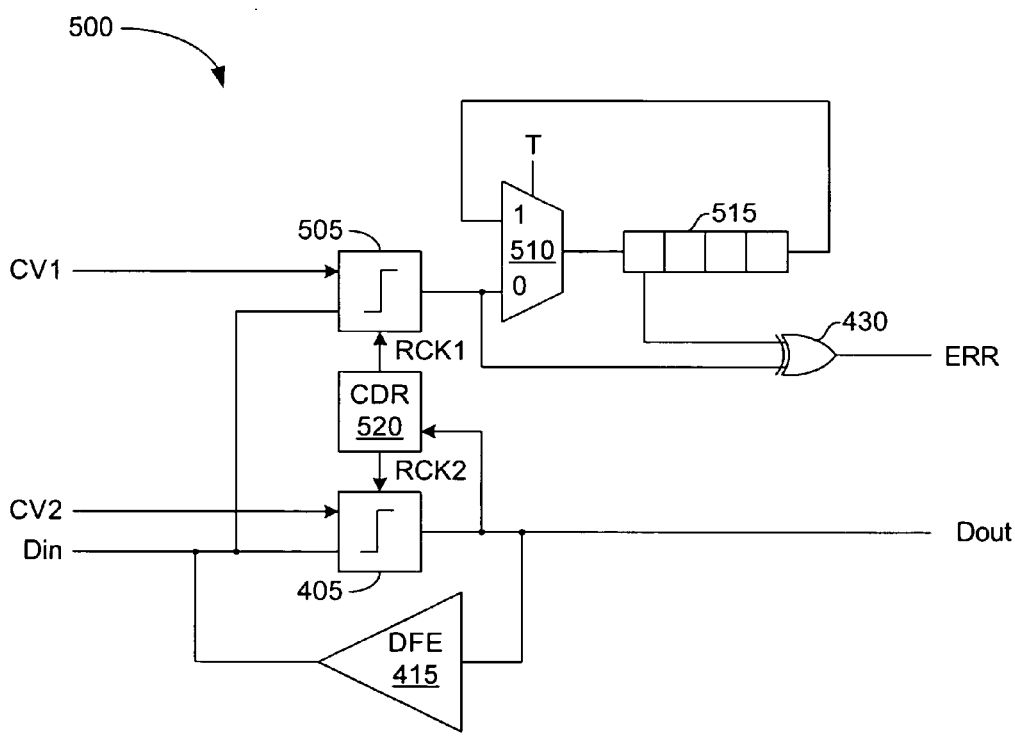
FIG. 5 depicts a DFE-equipped receiver 500 adapted in accordance with an embodiment to include improved means of margin testing.

FIG. 5 depicts a receiver circuit 500 in accordance with another embodiment. Receiver 500 is similar in some ways to receiver 403 of FIG. 4, like-numbered elements being the same. Receiver 500 is extended to include a second sampler 505 that is substantially identical to, and consequently mimics the behavior of, sampler 405. The margin tests are performed on replica sampler 505 so that margin-testing circuitry has little or no impact on the performance of receiver 500 in the operational mode.

Receiver 500 includes a multiplexer 510 connected to a shift register 515. A modified clock and data recovery circuit CDR 520 controls the timing of both samplers 505 and 405. The timing control terminal is omitted for brevity.

Prior to a margin test, test signal T is set to logic zero and the storage elements within register 515 are loaded with an expected-data sequence. Then, in the test mode, test terminal T is set to logic one so that shift register 515 feeds its output back to its input via multiplexer 510. To perform a margin test, sampler 505 samples input data Din. Comparison circuit 430 compares the resulting samples with the expected-data sequence provided by the first storage element in register 515. Any difference between the data sampled by the replica sampler 505 and the expected sequence from register 515 induces comparison circuit 430 to produce a logic one error signal on line ERR. Clocking circuitry, e.g. within CDR 520, can be adapted to control separately the recovered clock signals RCK1 and RCK2.

Figure 6:
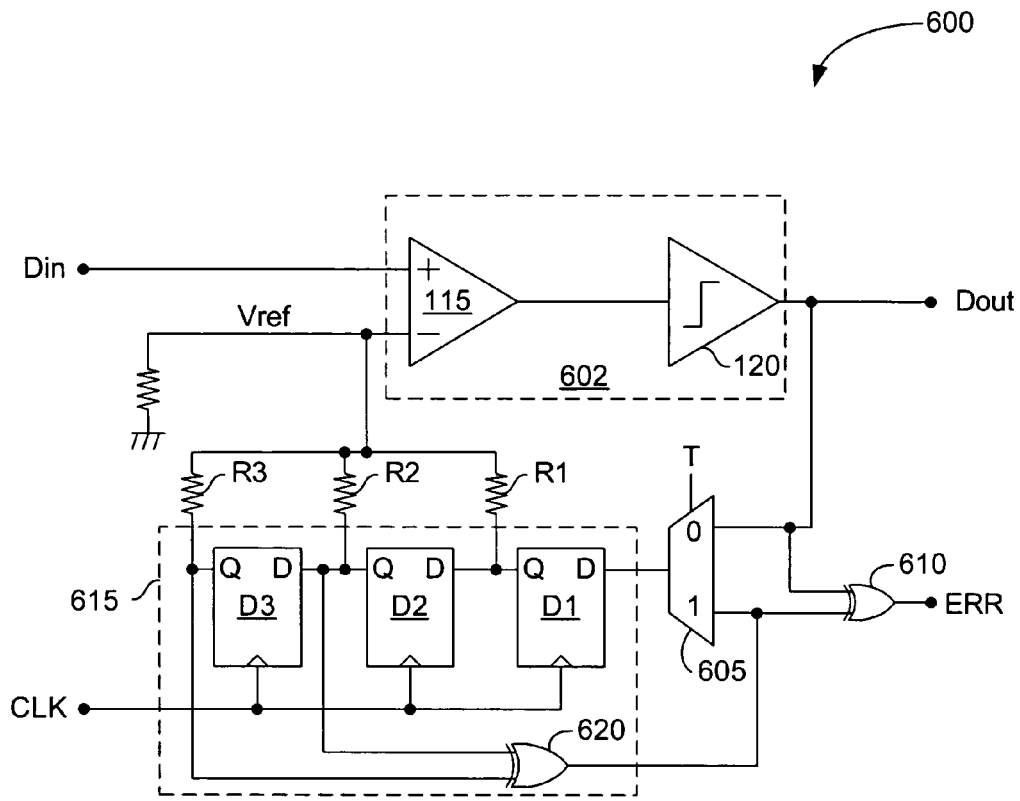
FIG. 6 depicts a receiver 600 in accordance with another embodiment.

FIG. 6 depicts a receiver 600 in accordance with another embodiment. Receiver 600 is similar to the conventional receiver 100 of FIG. 1, but is modified to support improved margin testing.

Receiver 600 includes a sampler 602 that, like sampler 105 of FIG. 1, includes a differential amplifier 115 and a decision circuit 120. Although not shown, sampler 602 includes conventional means of adjusting the reference voltage and timing to support margin testing. DFE of receiver 600 performs conventionally in the operational mode and provides expected data in the margin-test mode.

Receiver 600 includes a multiplexer 605, a comparison circuit 610, and a dual-mode register 615. Multiplexer 605 conveys output signal Dout to register 615 in the operational mode. Thus configured, receiver 600 functions analogously to receiver 100 of FIG. 1. That is, register 615 shifts in the output data Dout and employs three bits of historic data to provide ISI-minimizing feedback to sampler 602.

During margin testing, test signal T is set to logic one. In that case, multiplexer 605 provides the output of an XOR gate 620 to the input of register 615. The inclusion of XOR gate 620 and the path through multiplexer 605 converts register 615 into a linear-feedback shift register (LFSR) that provides a pseudo-random but deterministic sequence of bits to both the input of register 615 and comparison circuit 610. Also during the margin test, the same pseudo-random sequence produced by register 615 is provided on input terminal Din. This test sequence is applied one clock cycle ahead of the expected data in flip-flop D1 of register 615, so the DFE will reflect the appropriate data regardless of whether output data Dout is correct. The timing and reference voltage of sampler 602 can therefore be adjusted while monitoring output data Dout for errors without fear of collapsing the margin limits. Comparison circuit 610, an exclusive OR gate in this example, flags any mismatches between the output data and the expected data to identify errors.

In the example of FIG. 6, the pseudo-random sequence of test bits applied to input terminal Din is assumed to come from an external source, such as a conventional tester. The disclosed embodiments can also be adapted to support built-in self test (BIST) or in-system testing. For example, a linked transmitter/receiver pair adapted in accordance with one embodiment can margin test the intervening link. In other embodiments, receiver 600 is modified so that register 615 or another on-chip source provides the input test sequence. In some embodiments, register 615 is extended to include additional storage elements to produce more complex pseudo-random bit sequences. In such cases, the number of outputs from register 615 to the input of sampler 602 can be the same as or different from the number of storage elements employed by the LFSR. For additional details regarding LFSRs, see "What's an LFSR," document no.

SCTA036A from Texas Instruments™ (12/1996) and the Xilinx™ application note entitled "Efficient Shift Registers, LFSR Counters, and Long Pseudo-Random Sequence Generators," by Peter Alfke, XAPP 052, 7 Jul. 1996 (Version 1.1), both of which are incorporated herein by reference.

Figure 7:
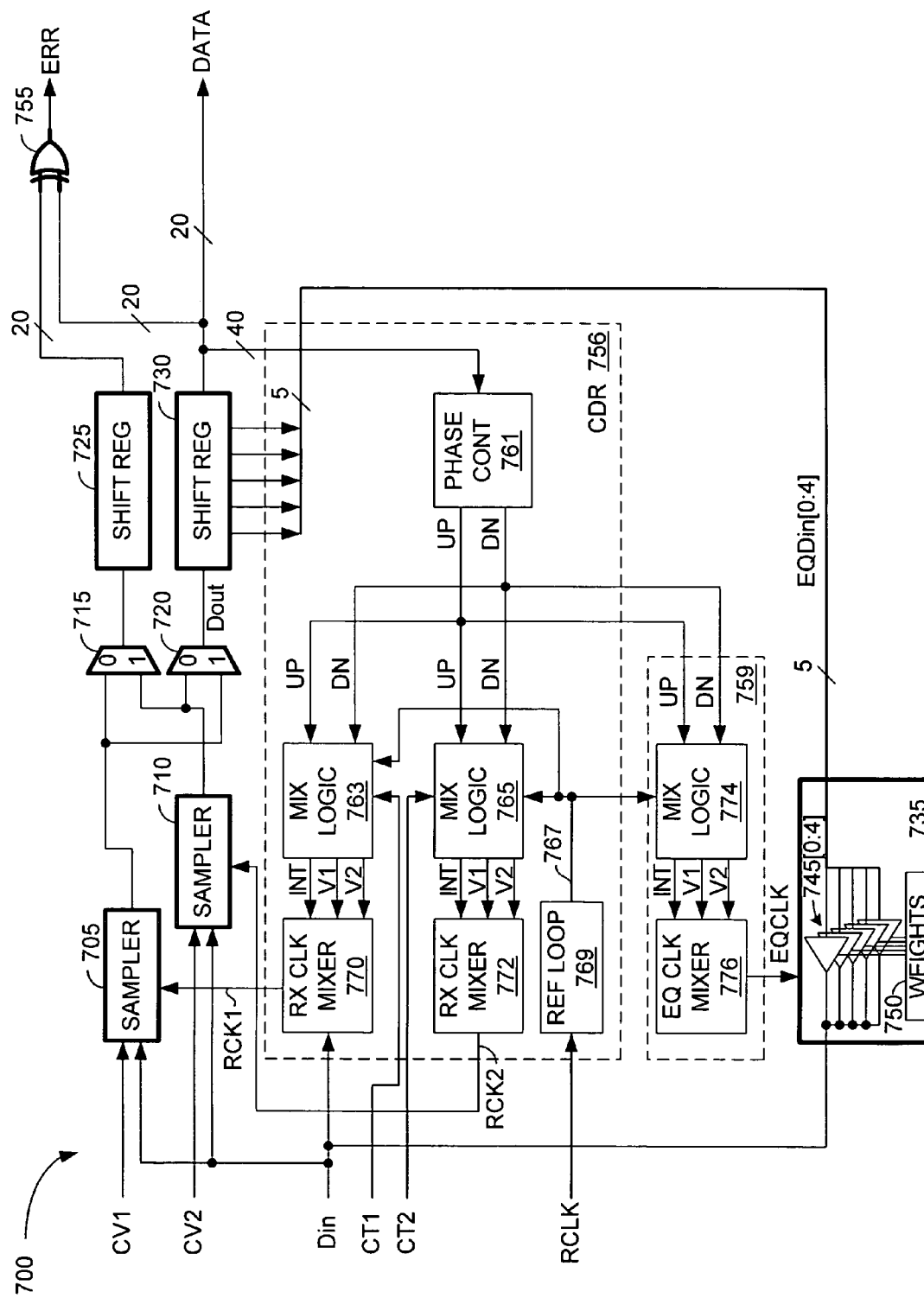
FIG. 7 depicts a receiver 700 in accordance with yet another embodiment.

FIG. 7 depicts a receiver 700 in accordance with yet another embodiment. FIG. 7 includes a number of elements that are incidental to the inventive margin-testing circuitry, and so are only touched upon briefly here. The main components of the margin-testing circuitry are highlighted using bold outlines to distinguish them from incidental features. The emphasized components include a pair of conventional samplers 705 and 710 receiving input data on the same input terminal, Din, a pair of multiplexers 715 and 720, a pair of shift registers 725 and 730, and a data-weighting circuit 735.

In the operational mode, multiplexers 715 and 720 both select their zero input. The input data Din captured by samplers 705 and 710 is thus conveyed to respective shift registers 725 and 730. The data in shift register 730 is the output data DATA of receiver 700, and is fed back to weighting circuit 735. For equalization feedback, all or a subset of the bits stored in the plurality of storage elements that make up shift register 730 are provided to weighting circuit 735. In one embodiment, shift registers 725 and 730 each store twenty bits. Of these, five bits from register 730 are conveyed to weighting circuit 735. The selected bits and their associated weighting are optimized for a given receiver. For a detailed discussion of methods and circuits for performing such optimization, see U.S. application Ser. No. 10/195,129 entitled "Selectable-Tap Equalizer," by Zerbe et al., filed Jul. 12, 2002, which is incorporated herein by reference. The details of that reference pertain to the optimization of a number of novel receivers. The margining methods and circuits disclosed herein may be of use in any systems that employ historical data to reduce ISI.

Weighting circuit 735 produces a weighted sum of a plurality of historical bits and applies this sum to input terminal Din. This is the same general function provided by the DFE ladder circuit of FIG. 1, though the manner in which these weighting circuits perform this function differs significantly.

Weighting circuit 735 includes five amplifiers 745[0:4], each of which receives a bit from shift register 730. A weight-reference circuit 750 provides each amplifier 745 with a reference signal (e.g., a constant current) that determines the weight given to the associated bit. The output terminals of amplifiers 745[0:4] are connected to input terminal Din to provide a weighted sum of five historical data values from shift register 730. A current-controlled embodiment of an amplifier 745[i] is detailed below in connection with FIG. 8.

In the margin-test mode, each of multiplexers 715 and 720 selects its "one" input. The output of sampler 705 is thus conveyed to shift register 730 and the output of sampler 710 is conveyed to shift register 725. Recall that a function of the margin-test mode is to provide expected data to the input of the DFE circuitry. In this case, the expected data is the input data sampled by sampler 705 and captured in shift register 730. A voltage-control signal CV2 and timing control signal CT2 allow a tester or test personnel to alter the reference voltage and received clock RCK2 as necessary to probe the margin boundaries for sampler 710. Similar control signals CV1 and CT1 afford similar control over sampler 705 and are set to appropriate levels to ensure sampler 705 correctly captures the input data.

During a margin test, erroneous data bits from sampler 710 pass through shift register 725. Comparison circuit 755 therefore produces a logic-one error signal on line ERR. In this embodiment, it is not necessary to store expected data in advance or to provide a dedicated source of expected data. Instead, the expected data is derived from input data on terminal Din sampled by sampler 705. The sampler used to produce output data in the operational mode, sampler 710, is the same register subjected to the margin test. Testing the receive circuitry, as opposed to a replica, is advantageous because it provides a more accurate reading of the actual receive-circuitry performance. Also important, sampler 705 can be margined in a normal operating mode, assuming that it has independent timing and voltage control relative to sampler 710. Sampler 705 can also be margin tested and the respective sample point (voltage and timing) centered in the data eye prior to margin testing sampler 710.

Receiver 700 of FIG. 7 is an equalizing receiver that generates receive and equalization clock signals. The following discussion outlines various features of receiver 700. For a more detailed discussion of similar receivers, see the above-incorporated application to Zerbe et al.

In addition to the components discussed above in relation to the margin-testing methods and circuits, receiver 700 includes a CDR circuit 756 and an equalizer clock generator 759. Samplers 705 and 710 sample incoming data signal Din in response to respective receive-clock signals RCK1 and RCK2, both the which are derived from a reference clock RCLK. The samples taken by sampler 710 are shifted into register 730, where they are stored for parallel output via output bus DATA to some application logic (not shown) and to CDR circuit 756.

Receive clock signal RCLK includes multiple component clock signals, including a data clock signal and its complement for capturing even and odd phase data samples, and an edge clock signal and a complement edge clock signal for capturing edge samples (i.e., transitions of the data signal between successive data eyes). The data and edge samples are shifted into shift registers 725 and 730. Samples in register 730 are then supplied as parallel words (i.e., a data word and an edge word) to a phase control circuit 761 within CDR circuit 756. Phase control circuit 761 compares adjacent data samples (i.e., successively received data samples) within a data word to determine when data signal transitions have taken place, then compares an intervening edge sample with the preceding data sample (or succeeding data sample) to determine whether the edge sample matches the preceding data sample or succeeding data sample. If the edge sample matches the data sample that precedes the data signal transition, then the edge clock is deemed to be early relative to the data signal transition. Conversely, if the edge sample matches the data sample that succeeds the data signal transition, then the edge clock is deemed to be late relative to the data signal transition. Depending on whether a majority of such early/late determinations indicate an early or late edge clock (i.e., there are multiple such determinations due to the fact that each edge word/data word pair includes a sequence of edge and data samples), phase control circuit 761 asserts an up signal (UP) or down signal (DN). If there is no early/late majority, neither the up signal nor the down signal is asserted.

Each of a pair of mix logic circuits 763 and 765 receives a set of phase vectors 767 (i.e., clock signals) from a reference loop circuit 769 and respective timing control signals CT1 and CT2 as noted above. The phase vectors have incrementally offset phase angles within a cycle of a reference clock signal. For example, in one embodiment the reference loop outputs a set of eight phase vectors that are offset from one another by 45 degrees (i.e., choosing an arbitrary one of the phase vectors to have a zero degree angle, the remaining seven phase vectors have phase angles of 45, 90, 135, 180, 225, 270, and 315 degrees). Mix logic circuits 763 and 765 maintain respective phase count values, each of which includes a vector-select component to select a phase-adjacent pair of the phase vectors (i.e., phase vectors that bound a phase angle equal to 360°/N, where N is the total number of phase vectors), and an interpolation component (INT). The interpolation component INT and a pair of phase vectors V1 and V2 are conveyed from each of mix logic circuits 763 and 765 to respective receive-clock mixer circuits 770 and 772. Mixer circuits 770 and 772 mix their respective pairs of phase vectors according to the interpolation component INT to generate complementary edge clock signals and complementary data clock signals that collectively constitute first and second receive-clock signals RCK1 and RCK2, which serve as input clocks for samplers 705 and 710, respectively. Timing control signals CT1 and CT2 facilitate independent control of the timing of clock signals RCK1 and RCK2.

Mix logic circuit 765 increments and decrements the phase count value in response to assertion of the up and down signals, respectively, thereby shifting the interpolation of the selected pair of phase vectors (or, if a phase vector boundary is crossed, selecting a new pair of phase vectors) to retard or advance incrementally the phase of the receive clock signal. For example, when the phase control logic 761 determines that the edge clock leads the data transition and asserts the up signal, mix logic 765 increments the phase count, thereby incrementing the interpolation component INT of the count and causing mixer 772 to incrementally increase the phase offset (retard the phase) of receive-clock signal RCK1. At some point, the phase control signal output begins to dither between assertion of the up signal and the down signal, indicating that edge clock components of the receive clock signal have become phase aligned with the edges in the incoming data signal. Mix logic 763 and mixer 770 are analogous to mix logic 765 and 772, but control the receive clock RCK1 to sampler 705. These redundant circuits are provided so the receive-clock timing to samplers 705 and 710 can be independently adjusted during margin testing.

The equalizer clock generator 759 receives the phase vectors 767 from the reference loop 769 and includes mix logic 774 and an equalizer clock mixer 776, which collectively operate in the manner described above in connection with mix logic 765 and mixer 772. That is, mix logic 774 maintains a phase count value that is incrementally adjusted up or down in response to the up and down signals from the phase control circuit 761. The mix logic selects a phase-adjacent pair of phase vectors 767 based on a vector select component of the phase count. The mix logic then outputs the selected vectors (V1, V2) and interpolation component of the phase count (INT) to the equalizer clock mixer 776. Clock mixer 776 mixes the selected vectors in accordance with the interpolation component of the phase count to generate the equalizer clock signal EQCLK. The equalizer clock signal, which may include complementary component clock signals, is provided to weighting circuit 735 (or another type of equalization circuit) to time the output of equalizing signals onto data input terminal Din.

Figure 8:
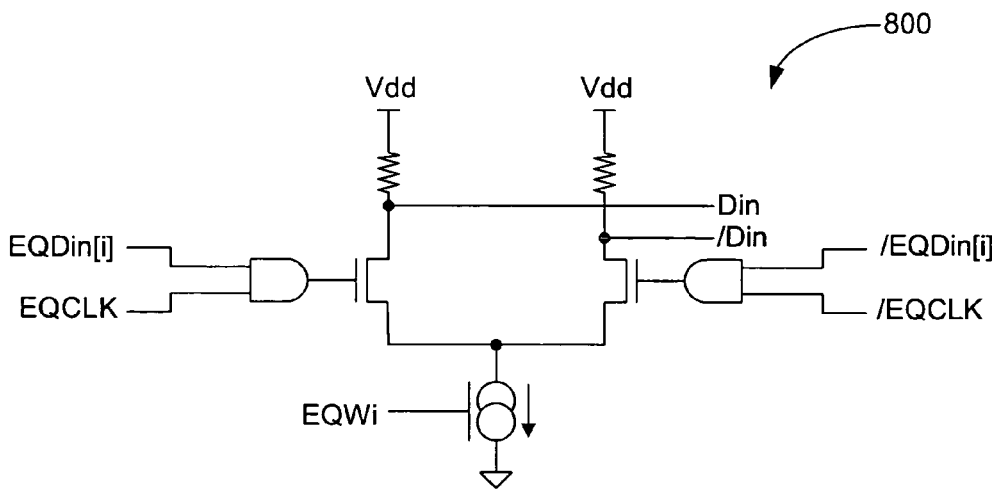
FIG. 8 depicts an embodiment of a buffer 800, which may be used as one of amplifiers 745 in weighting circuit 735 of FIG. 7.

FIG. 8 depicts an embodiment of a buffer 800 that may be used as one of amplifiers 745 in weighting circuit 735 of FIG. 7 in an embodiment in which the data input Din is a two-terminal port receiving differential input signals Din and /Din. Clock signal EQCLK is also a differential signal EQCLK and /EQCLK in this embodiment.

Buffer 800 receives one of five differential feedback signals (EQDin[i] and /EQDin[i]) and the differential clock signal (EQCLK and /EQCLK) from mixer 776. Reference circuit 750 provides a reference voltage EQWi that determines the current through buffer 800, and consequently the relative weight of the selected feedback data bit.

The above-described embodiments are adapted for use in receivers of various types. The embodiment of FIG. 6, for example, is applied to a receiver adapted to receive single-ended input signals, while the embodiments of FIGS. 7 and 8 are applied to receivers adapted to receive complementary signals. These examples are not limiting, as these and other embodiments can be applied to receivers adapted to communicate signals in any of a number of communication schemes, including pulse-amplitude modulated (PAM) signals (e.g., 2-PAM and 4-PAM), which may be used in some embodiments to provide increased data rates.

Figure 9:
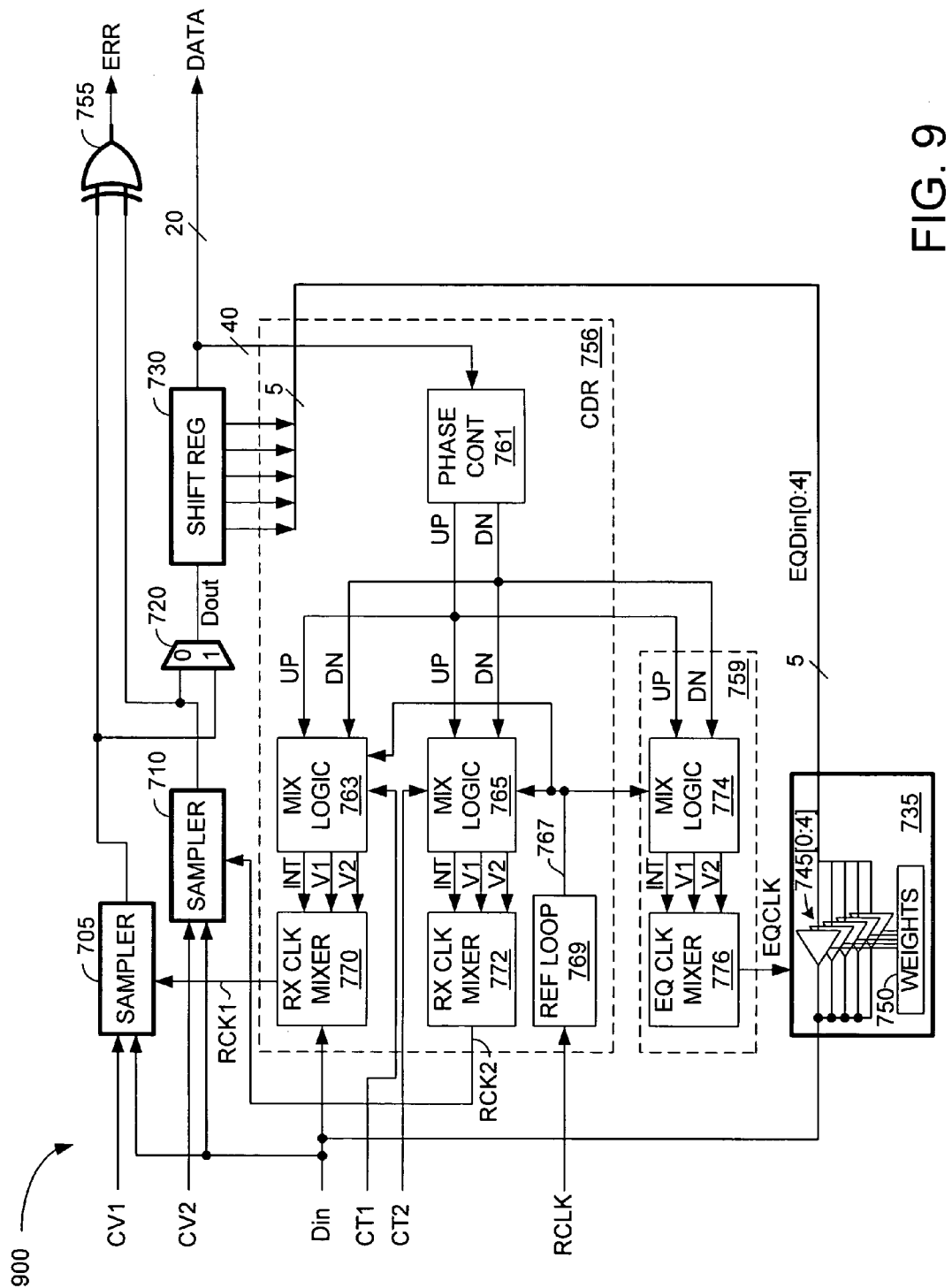
FIG. 9 depicts a receiver 900 in accordance with another embodiment.

FIG. 9 depicts a receiver 900 in accordance with another embodiment. Receiver 900 is similar to receiver 700 of FIG. 7, like-identified elements being the same or similar. Receiver 900 differs from receiver 700 in that receiver 900 omits multiplexer 715 and shift register 725. XOR gate 755 detects errors by comparing the data symbols from samplers 705 and 710. As in receiver 700, both samplers 705 and 710 can be margined in a normal operating mode. The operation of receiver 900 is otherwise similar to that of receiver 700.

Receivers 700 and 900, detailed in connection with respective FIGS. 7 and 9, do not require a predetermined pattern of data (i.e., an "expected" data pattern"), and can thus be margined in the presence of the data patterns received during normal operation. The ability to detect system margins in system and without disrupting the normal flow of data enables accurate in-system margin test. In addition, receivers so equipped can be adapted to dynamically alter system parameters to maintain adequate margins.

Margin Mapping (Shmoo Plots)

Figure 10A:
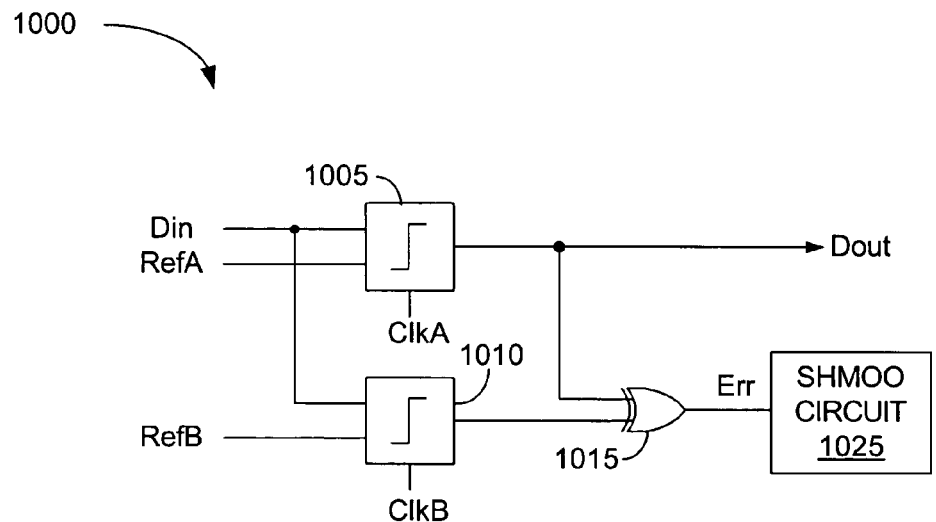
FIG. 10A depicts a receiver 1000, a simplified version of receiver 900 of FIG. 9 used to illustrate margin mapping in accordance with one embodiment.

FIG. 10A depicts a receiver 1000, a simplified version of receiver 900 of FIG. 9 used to illustrate margin mapping in accordance with one embodiment. Receiver 1000 includes two samplers 1005 and 1010, an XOR gate 1015, and a "shmoo" circuit 1025. As used herein, a shmoo circuit is used to develop shmoo data, shmoo data is information that represents margin test results for a given sample point, and a shmoo plot is a graph that represents shmoo data to illustrate how a particular margin test or series of margin tests passes or fails in response to changes in the reference voltage and reference timing. Samplers 1005 and 1010 receive the same input data Din, but have independently adjustable reference voltages RefA and RefB and reference clocks ClkA and ClkB.

Figure 10B:
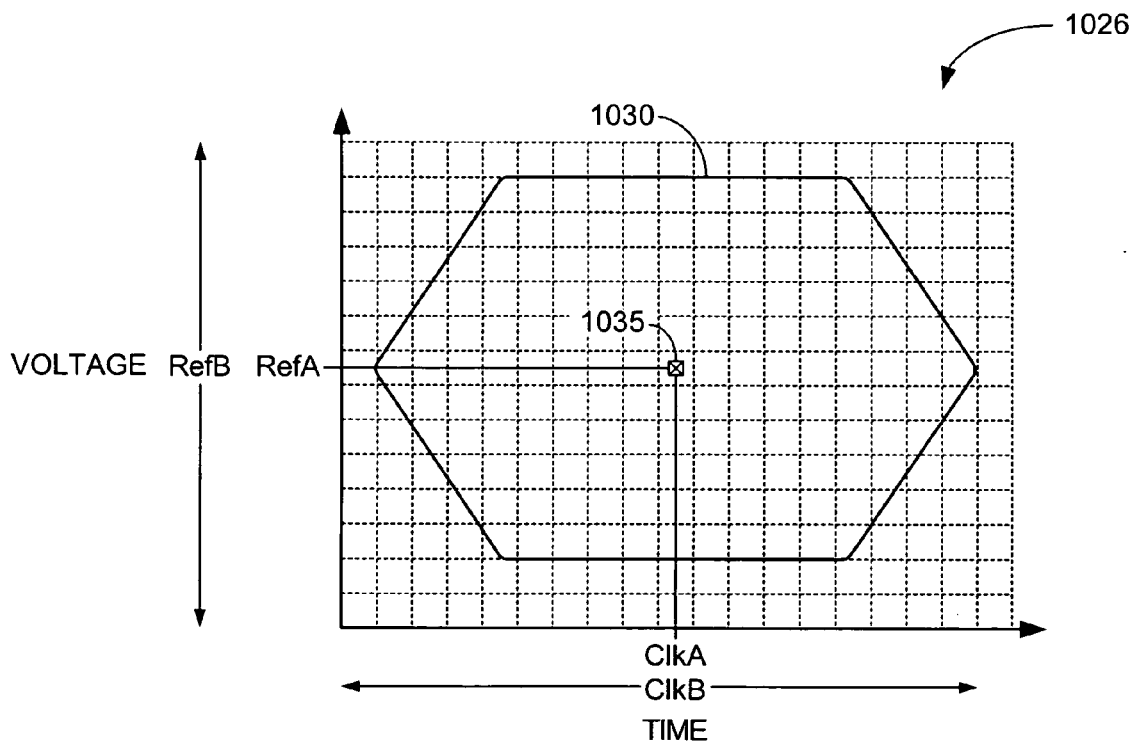
FIG. 10B is a diagram illustrating the relationship between each of samplers 1005 and 1010 of FIG. 10A and a data eye 1030.

FIG. 10B is a diagram 1026 illustrating the relationship between each of samplers 1005 and 1010 and a data eye 1030. Each Cartesian coordinate on diagram 1026 represents a sample coordinate, the Y axis being representative of sample voltage and the X axis being representative of sample time. A data point 1035 is centered in data eye 1030 along both axes, and thus represents an ideal sample point for sampler 1005.

To perform a margin test, reference voltage RefB and reference clock ClkB are adjusted along their respective Y and X axes to sample data symbols at each coordinate one or more times to probe the boundaries of eye 1030. Margins are detected when XOR gate 1015 produces a logic one, indicating that sampler 1010 produced different data than sampler 1005. Shmoo circuit 1025 correlates errors with the respective reference voltage RefB and clock signal ClkB for sampler 1010 and stores the resulting X-Y coordinates. Care should be taken to ensure proper clock-domain crossing of the two reference clocks ClkA and ClkB to prevent data samplers 1005 and 1010 from sampling different data eyes (e.g., to prevent respective samplers from sampling different ones of two successive data symbols). Signals RefB and ClkB can be interchanged with respective signals RefA and ClkA in FIG. 10B to margin sampler 1010. Methods and circuits for adjusting clock phases and reference voltages are well known in the art, and are therefore omitted here for brevity.

Figure 10C:
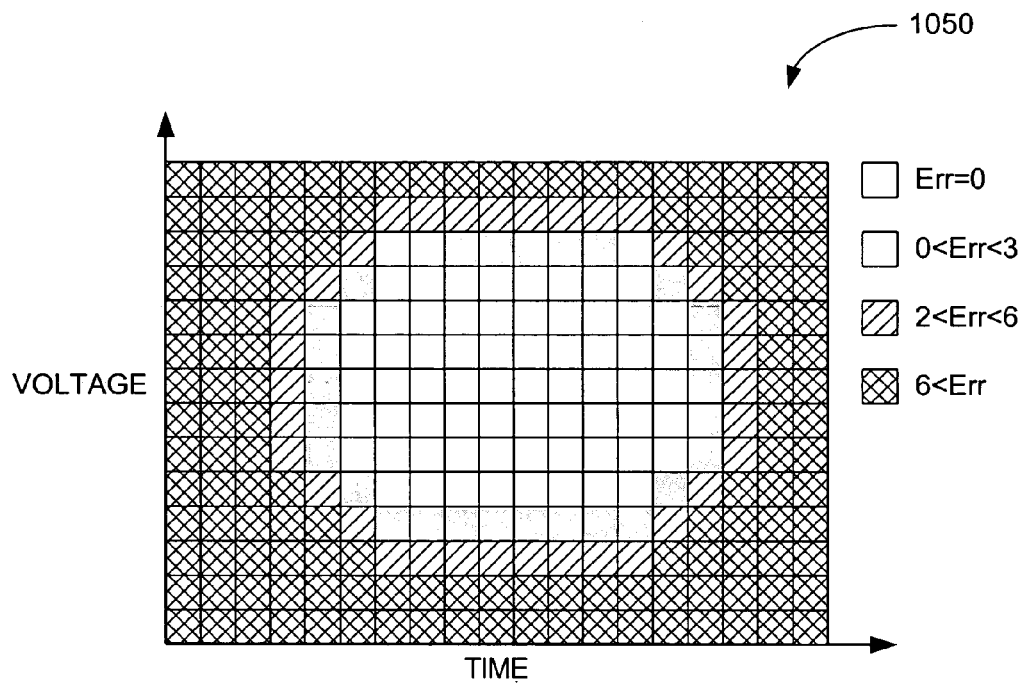
FIG. 10C depicts a shmoo plot 1050 graphically depicting an illustrative margin test in accordance with one embodiment.

FIG. 10C depicts a shmoo plot 1050 graphically depicting an illustrative margin test in accordance with one embodiment. During margin test, reference voltage RefB and reference clock ClkB are adjusted to sample incoming data at each voltage/time square (sample point) represented in FIG. 10C. The number of errors encountered over a fixed time is then recorded for each sample coordinate. The resulting plot for a given receiver will bear a resemblance to plot 1050, though will typically be less uniform than this illustration.

Plot 1050 can be used in a number of ways. Returning to FIG. 10B, for example, data point 1035 is depicted in the center of eye 1030, an ideal circumstance. Plot 1050 can be used to precisely locate the true center of eye 1030. Once this center is known, reference voltage RefA and reference clock ClkA can be adjusted as needed to maximize the margins for sampler 1005.

Plot 1050 can also be used to establish different margins depending upon the allowable bit-error rate (BER) for the communication channel of interest. Different communication schemes afford different levels of error tolerance. Communications channels can therefore be optimized using margin data gathered in the manner depicted in FIG. 10C. For example, an error-intolerant communication scheme might require the zero-error margin, whereas a more tolerant scheme might be afforded the larger margin associated with a small number of errors per unit time.

Adaptive Margining

Some embodiments detect and maintain margins without storing the shmoo data graphically depicted in FIG. 10C. One or more additional samplers can be used to probe the margins periodically or dynamically, and the sampler used to obtain the sampled data can be adjusted accordingly. In one embodiment, for example, the reference voltage and clock of the sampler used to obtain the sampled data are adjusted in response to perceived errors to maintain maximum margins. With reference to FIG. 10A, sampler 1010 can periodically probe the high and low voltage margins and then set reference voltage RefA between them. With reference voltage RefA thus centered, the process can be repeated, this time adjusting the phase of reference clock ClkB to detect the timing margins. The phase of reference clock ClkA can then be aligned in eye 1030. In other embodiments, additional samplers can simultaneously probe different margins of eye 1030. Dynamic margining systems in accordance with these embodiments thus automatically account for time-variant system parameters (e.g., temperature and supply-voltage).

Figure 11:
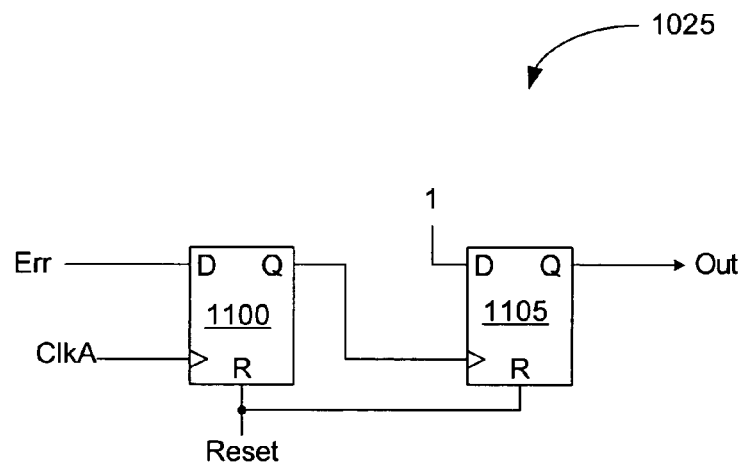
FIG. 11 details an embodiment of shmoo circuit 1025 of FIG. 10A.

FIG. 11 details an embodiment of shmoo circuit 1025 of FIG. 10A. Shmoo circuit 1025 includes a pair of flip-flops 1100 and 1105. Flip-flop 1100 synchronizes error signal Err with a clock signal Clk. Flip-flop 1105, a ones detector, produces a logic-one output signal OUT in response to any logic ones received from flip-flop 1100. In operation, both flip-flops are reset to zero and error signal Err is monitored for a desired number of data samples at a given timing/voltage setting. Flip-flop 1100 captures any logic-one error signals Err, and ones detector 1105 transitions to logic one and remains there in response to any logic ones from flip-flop 1100. A logic one output signal OUT is therefore indicative of one or more error signals received in the sample period. In other embodiments, flip-flop 1105 is replaced with a counter that counts the number of captured errors for a given period. The number and duration of the sample periods can be changed as desired.

Figure 12:
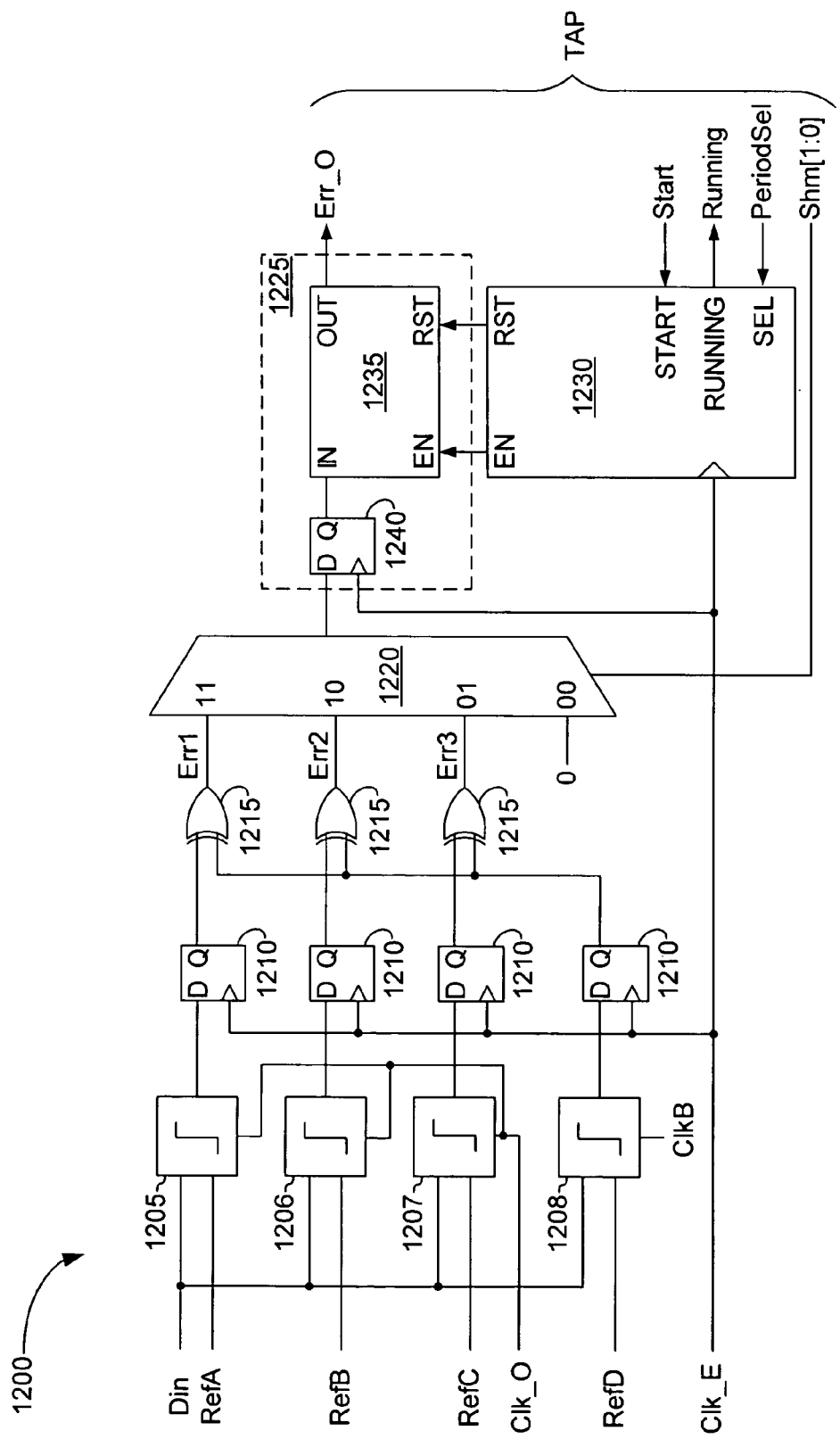
FIG. 12 details a receiver 1200 in accordance with another embodiment adapted to accommodate margin shmooing.

FIG. 12 details a double-data-rate (DDR) receiver 1200 in accordance with another embodiment adapted to accommodate margin shmooing. Receiver 1200 includes four data samplers 1205-1208 timed to an odd-phase clock Clk_O, four respective flip-flops 1210 timed to an even-phase clock Clk_E, three error-detecting XOR gates 1215, a multiplexer 1220, error-capturing logic 1225, and shmoo control logic 1230. An external tester (not shown) issues test instructions and receives margin-test results via a test-access port TAP. In another embodiment, the outputs from the three flip-flops 1210 following samplers 1205, 1206, and 1207 connect directly to corresponding inputs of multiplexer 1220. A single XOR gate on the output side of multiplexer 1220 then compares the selected sampler output signal with the output from sampler 1208.

As is conventional, DDR receivers receive data on two clock phases: an odd clock phase Clk_O and an even clock phase Clk_E. Receiver 1200 represents the portion of a DDR receiver that captures incoming data using the odd clock phase Clk_O. Signals specific to only one of the clock phases are indicated by the suffix "_E" or "_O" to designate an even or odd phase, respectively. Samplers 1205, 1206, and 1207 are portions of the "odd" circuitry. Similar samplers are provided for the even circuitry but are omitted here for brevity. The odd and even clock phases of a DDR high-speed serial input signal can be shmooed separately or in parallel.

Receiver 1200 enters a shmoo mode at the direction of the external tester. Shmoo select signals Shm[1:0] then cause multiplexer 1220 to connect the output of one of XOR gates 1215 to the input of error-capturing logic 1225. The following example assumes multiplexer 1220 selects error signal Err1 to perform margin tests on sampler 1205. Margin tests for the remaining samplers 1206 and 1207 are identical.

The external tester initiates a shmoo test cycle by issuing a rising edge on terminal Start. In response, control logic 1230 forces a signal Running high and resets a ones detector 1235 within error-capturing logic 1225 by asserting a reset signal RST. When signal Start goes low, control logic 1230 enables ones detector 1235 for a specified number of data clock cycles—the "shmoo-enable interval"—by asserting an enable signal EN. When period-select signal PeriodSel is zero, the number of data clock cycles in the shmoo-enable interval is 160 (320 symbol periods). When signal PeriodSel is one, the number of data clock cycles in the shmoo-enable interval is 128 (256 symbol periods).

The lower-most sampler 1208, in response to control signals from the external tester, shmoos the margins for the sampler 1205 selected by multiplexer 1220. The shmooing process is similar to that described above in connection with FIGS. 10A, 10B, and 10C. The process employed by receiver 1200 differs slightly, however, in that receiver 1200 takes advantage of the presence of even clock Clk_E and flip-flops 1210 to retime the input signals to XOR gates 1215. Even clock Clk_E is 180 degrees out of phase with respect to odd clock Clk_O. Clock signal ClkB can therefore be varied up to 90 degrees forward or backward with respect to odd clock Clk_O without fear of sampling different data symbols with the selected sampler 1205 and sampler 1208.

The upper-most XOR gate 1215 produces a logic one if, during the shmoo-enable interval, one or more bits from sampler 1205 mismatches the corresponding bit from sampler 1208. A flip-flop 1240 captures and conveys this logic one to ones detector 1235. At the end of the shmoo-enable interval, controller 1230 brings signal Running low and holds the state of signal Err_O. A logic one error signal Err_O indicates to the tester that at least one mismatch occurred during the shmoo-enable interval, whereas a logic zero indicates the absence of mismatches.

The shmoo interval can be repeated a number of times, each time adjusting at least one of reference voltage RefD and clock CLKB, to probe the margins of input data Din. A shmoo plot similar to that of FIG. 10B can thus be developed for sampler 1205. This process can then be repeated for the remaining samplers.

Control logic 1230 does not interfere with the normal operation of receiver 1200, so shmooing can be performed for any type of input data Din. Also advantageous, receiver 1200 allows for the capture of real data eyes under various operating conditions, and can be used to perform in-system margin tests.

Other embodiments repeat the process a number of times for each of an array of voltage/time data points to derive margin statistics that relate the probability of an error for various sample points within a given data eye. Still other embodiments replace ones detector 1235 with a counter that issues an error sum count for each shmoo-enable interval.

In one embodiment, receiver 1200 samples four-level, pulse-amplitude-modulated (4-PAM) signals presented on terminal Din, in which case each of samplers 1205-1207 samples the input data symbols using a different reference voltage level. In general, the methods and circuits described herein can be applied to N-PAM signaling schemes, where N is at least two. Such systems typically include N-1 samplers for each data input node.

Figure 13:
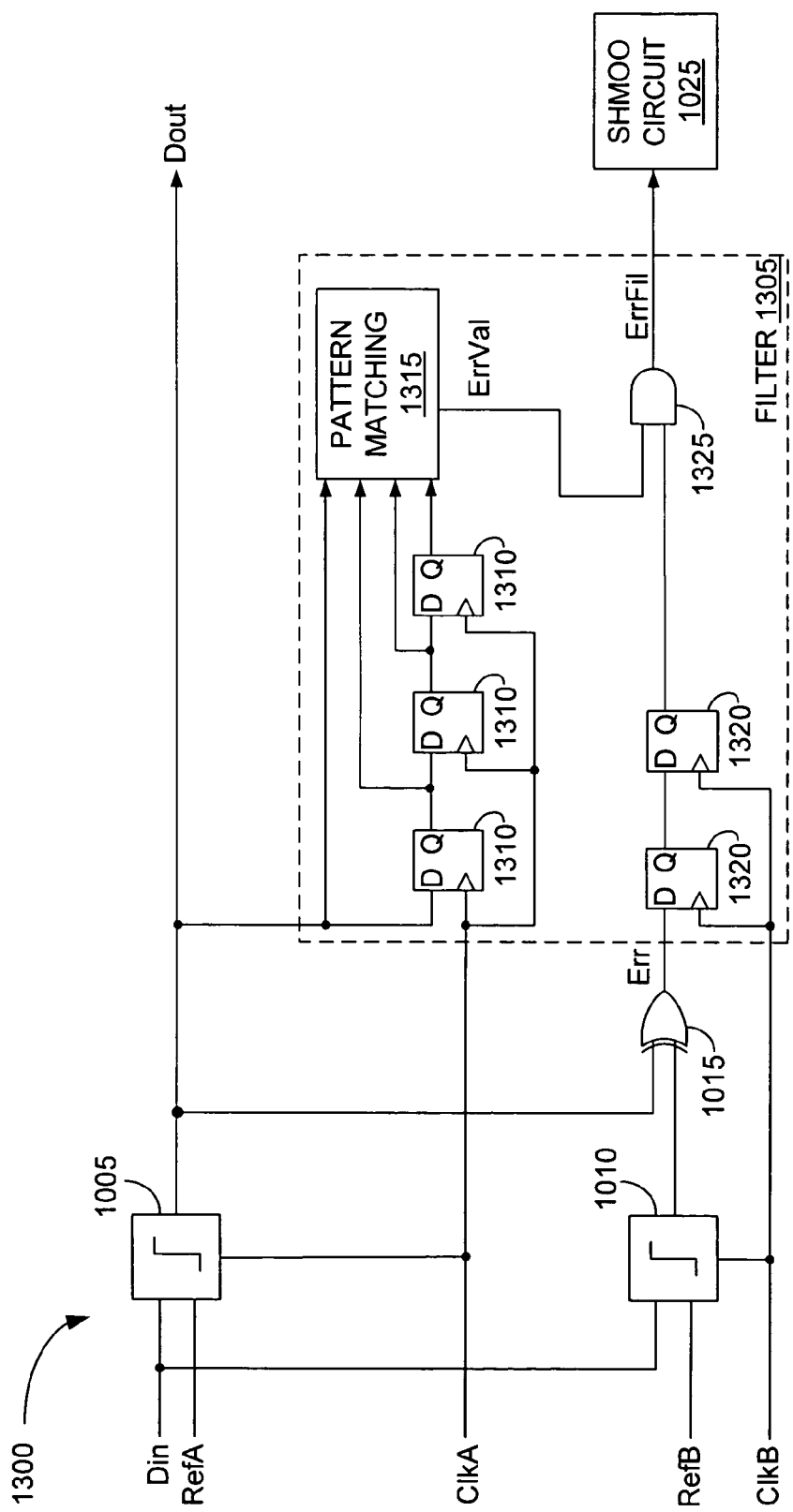
FIG. 13 depicts a receiver 1300 that supports error filtering in accordance with another embodiment.

FIG. 13 depicts a receiver 1300 that supports error filtering in accordance with another embodiment. Receiver 1300 is similar to receiver 1000 of FIG. 10A, like-numbered elements being the same or similar. Receiver 1300 differs from receiver 1000 in that receiver 1300 includes data filter 1305 that allows receiver 1300 to shmoo particular data patterns. This is a benefit, as a receiver's margin may differ for different data patterns, due to ISI for example. Data filter 1305 allows receiver 1300 to perform pattern-specific margin tests to better characterize receiver performance.

Data filter 1305 includes a series of N data registers 1310 that provide a sequence of data samples Dout to a pattern-matching circuit 1315. In this case N is three, but N may be more or fewer. Data filter 1305 also includes a series of M (e.g., two) error registers 1320 that convey a sequence of error samples to an input of an AND gate 1325. AND gate 1325 only passes the error signals from registers 1320 if pattern-matching circuit 1315 asserts a error-valid signal ErrVal on the other input of AND gate 1325. Pattern-matching circuit 1315 asserts signal ErrVal only if the pattern presented by registers 1310 matches some predetermined pattern or patterns stored in pattern-matching circuit 1315. In one embodiment external test circuitry (not shown) controls the patterns provided by matching circuit 1315. Other embodiments support in-system testing with one or more patterns provided internally (e.g., on the same semiconductor chip).

Some of the foregoing embodiments employ an additional sampler to probe the margins of a given data input. Some receiver architectures already include the requisite additional sampler, to support additional signaling modes, for example. Other embodiments may be adapted to include one or more additional "monitor" samplers.

Statistical Margin Testing

Figure 14:
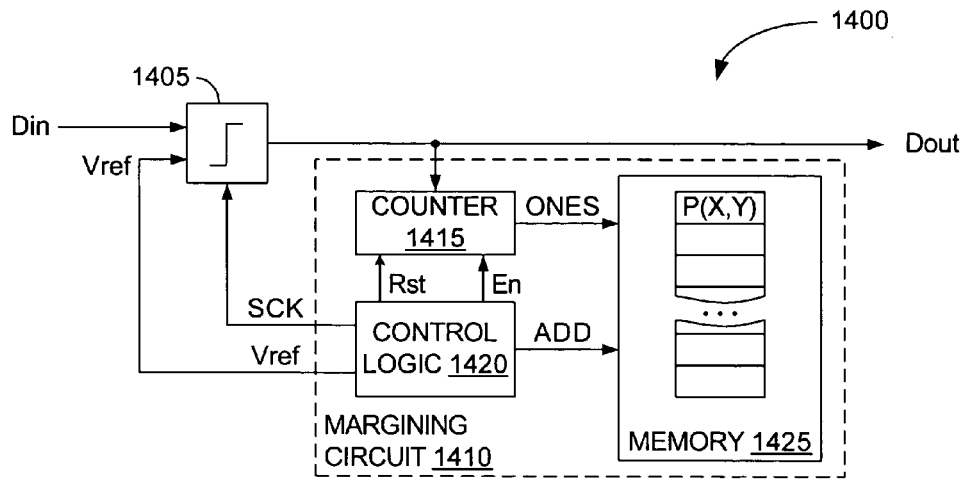
FIG. 14 depicts a receiver 1400 adapted to perform margin testing in accordance with another embodiment.

FIG. 14 depicts a receiver 1400 adapted to perform margin testing in accordance with another embodiment. Receiver 1400 includes a conventional sampler 1405, which in turn includes a data input terminal Din, a reference voltage terminal Vref, and a clock node SCK adapted to receive a sample-clock signal. Receiver 1400 additionally includes a margining circuit 1410 that controls the reference voltage Vref and the phase of sample clock SCK to sample the voltage/time (V/T) space of the incoming series of data symbols.

As is conventional, sampler 1405 uses reference voltage Vref as a voltage threshold for comparison to data symbols expressed on terminal Din. The voltage threshold of sampler 1405 can therefore be adjusted by altering reference voltage Vref. Threshold voltages may be varied in different ways in other types of receivers. For example, the voltage threshold of some differential receivers is varied by adjusting the differential input offset voltage of the sampler or of a preamplifier that precedes the sampler. A digital-to-analog converter controlled by a register can provide precise control for such offsets. In such receivers, margining circuit 1410 would control the threshold of sampler 1405 without necessarily providing an actual reference voltage Vref, as shown in FIG. 14. Sampler 1405 may include a preamplifier or other signal conditioning circuitry.

Margining circuit 1410 includes a counter 1415, control logic 1420, and some memory 1425. Margining circuit 1410 samples a number of received data symbols at each of a plurality of V/T coordinates to find the probability that the data at each coordinate is representative of a particular logic level, a logic one in this and the following examples. The collection of probability statistics for the entire V/T space are then used to characterize various input characteristics of the received data, including the margin of receiver 1400. This embodiment facilitates margin testing in system, does not require a separate sampler, and provides margin data based upon the performance of the relevant receiver.

Figure 15:
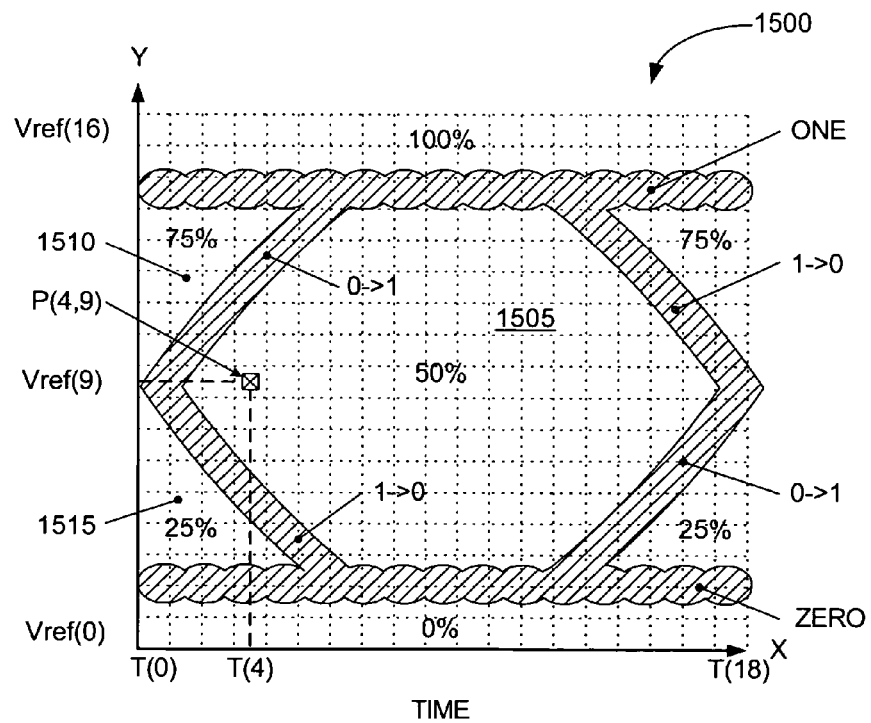
FIG. 15 depicts an eye diagram 1500 used to illustrate the functionality of receiver 1400 of FIG. 14.

FIG. 15 depicts an eye diagram 1500 used to illustrate the functionality of receiver 1400 of FIG. 14. As is conventional for two symbol (binary) signaling, eye diagram 1500 depicts an opening 1505 bounded by an upper horizontal line ONE representative of a logic one, a lower horizontal line ZERO representative of a logic zero, and four somewhat vertical signal-transition segments extending between lines ONE and ZERO. Bounding the left side of opening 1505 are (1) a zero-to-one transition segment 0-→1 representing a range of voltages over which input data Din transitions switching from zero to one and (2) a one-to-zero transition segment 1-→0 representing a range of voltages over which input data Din transitions when switching from one to zero. (Each of the depicted segments represents half of a transition, the remaining halves extending to the left and right of diagram 1500.)

The eye pattern of diagram 1500 is overlayed onto a grid in which the Y axis represents a range of seventeen reference voltages Vref[0:16] and the X axis represents a range of nineteen timing instants T[0:18] that correspond to phases of sample clock SCK. Diagram 1500 thus depicts 323 (17×19) sample points in V/T space.

In accordance with one embodiment, margining circuit 1410 of FIG. 14 adjusts reference voltage Vref and the phase of sample clock SCK to sample each point on the grid of diagram 1500 over N clock cycles, where N is a statistically significant number. Counter 1415 accumulates the number of ones detected over the N sampled input symbols for each sample point, and thus obtains some indication of the probability of receiving a logic one at that V/T point. One might assume, for example, that data Din will exhibit approximately the same number of ones and zeroes over a given period. This is often a good assumption, particularly in communication systems that employ balanced signaling schemes to support AC coupled communication channels.

The eye pattern of FIG. 15 is assumed to depict many cycles of a balanced signal (i.e., the same number of ones and zeroes over a statistically significant period). The shaded areas that make up the eye pattern represent the cumulative traces of input data Din over the many cycles. Ideally, the data can be sampled correctly anywhere within eye 1505. Unfortunately, true eye diagrams can be far less clearly defined than in FIG. 15. It is therefore important to characterize eye 1505 and center the sample point within eye 1505 to maximize the noise margin.

Assuming a balanced signal, any data sampled within eye 1505 should exhibit an equal number of ones and zeroes over time. Referring to sample point P(4,9), for example, the input data Din will be greater than the voltage at sample point P(4,9) half the time (i.e., will be at ONE) and less than the voltage at sample point P(4,9) half the time (i.e., will be at ZERO). In other words, the probability that the sampled data will be a logic one is 50%. The same is true of any point within eye 1505. Sampling data Din above trace ONE will always result in a logic one because all the voltage traces (the shaded areas) lay below those sample points, so the probability that the data will be a logic one is 100%. Similarly, sampling data Din below trace ZERO will always result in a logic zero because all the voltage traces lie above those sample points.

Ones probabilities are indicative of other portions of the eye diagram as well. Referring to area 1510, for example, data sampled within this area may be in one of for states: a logic one ONE, a logic zero ZERO, transitioning between zero and one (0-→1), and transitioning between one and zero (1-→0). Again assuming a balanced signal, there is an equal probability that incoming signal Din will be in any one of these four states. The sampling points within area 1510 are above three of these four possibilities, so data sampled in area 1510 will exhibit a logic one three out of four times, a 75% ones probability. Area 1515 is similar, but the sampling points within area 1515 are above only one of the four possibilities, so data sampled in area 1515 will exhibit a logic one only 25% of the time. The right side of diagram 1500 has 75% and 25% areas symmetrical with areas 1510 and 1515.

FIG. 15 illustrates the important point that the probability of sensing data of a particular type (e.g., the ones probability) changes at each boundary that defines eye 1505. The boundaries of the eye can therefore be detected by examining the ones probability (or zeroes probability) of incoming data over a range of sample voltages, sample timing, or both.

Returning to FIG. 14, margining circuit 1410 can map the ones probability for data across the V/T space depicted in FIG. 14 to characterize the margin of the incoming data. For each data point (e.g., P[0,0]), control logic 1420 sets the appropriate voltage and timing, resets counter 1415, and then enables counter 1415 to count received ones for some number of clock cycles (e.g., 1,000), which defines the sample period. At the end of the sample period, control logic 1420 conveys the contents of counter 1415 to a storage location within memory 1425 corresponding to the sample point. Referring to point P(4,9) of FIG. 15, for example, counter 1415 should count to 500 over 1,000 clock cycles, in which case the number 500 would be stored in location 4,9 of memory 1425. This process is continued for each sample point P(X,Y) until memory 1425 contains a number corresponding to the ones probability for each sample point within diagram 1500.

Figure 16:
FIG. 16 is a table 1600 depicting a hypothetical collection of data sampling points, the vertical axis plotting a range of fifteen sample voltages Vref[0:14] and the horizontal axis plotting a range of sample timing instants T[0:14].

FIG. 16 is a table 1600 depicting a hypothetical collection of data sampling points, the vertical axis plotting a range of fifteen sample voltages Vref[0:14] and the horizontal axis plotting a range of sample timing instants T[0:14]. Table 1600 represents raw data relating to the probability of sensing a logic one at two hundred twenty-five V/T sample points in relation to a stream of incoming data symbols. The expressed probability data defines boundaries of an exemplary data eye, and can be used to measure various data parameters, including the margin of the data eye. This example assumes that ten thousand samples are taken at each sample point and the number of sampled ones recorded in some suitable memory, either on or off the IC containing the receiver under test. As apparent from the hypothetical data, the number of ones recorded in each sample point ranges from zero (at points P[0,X]) to ten thousand (at points P[14,X]). The number of ones recorded for the remaining sample points lies between these two extremes.

Figure 17:
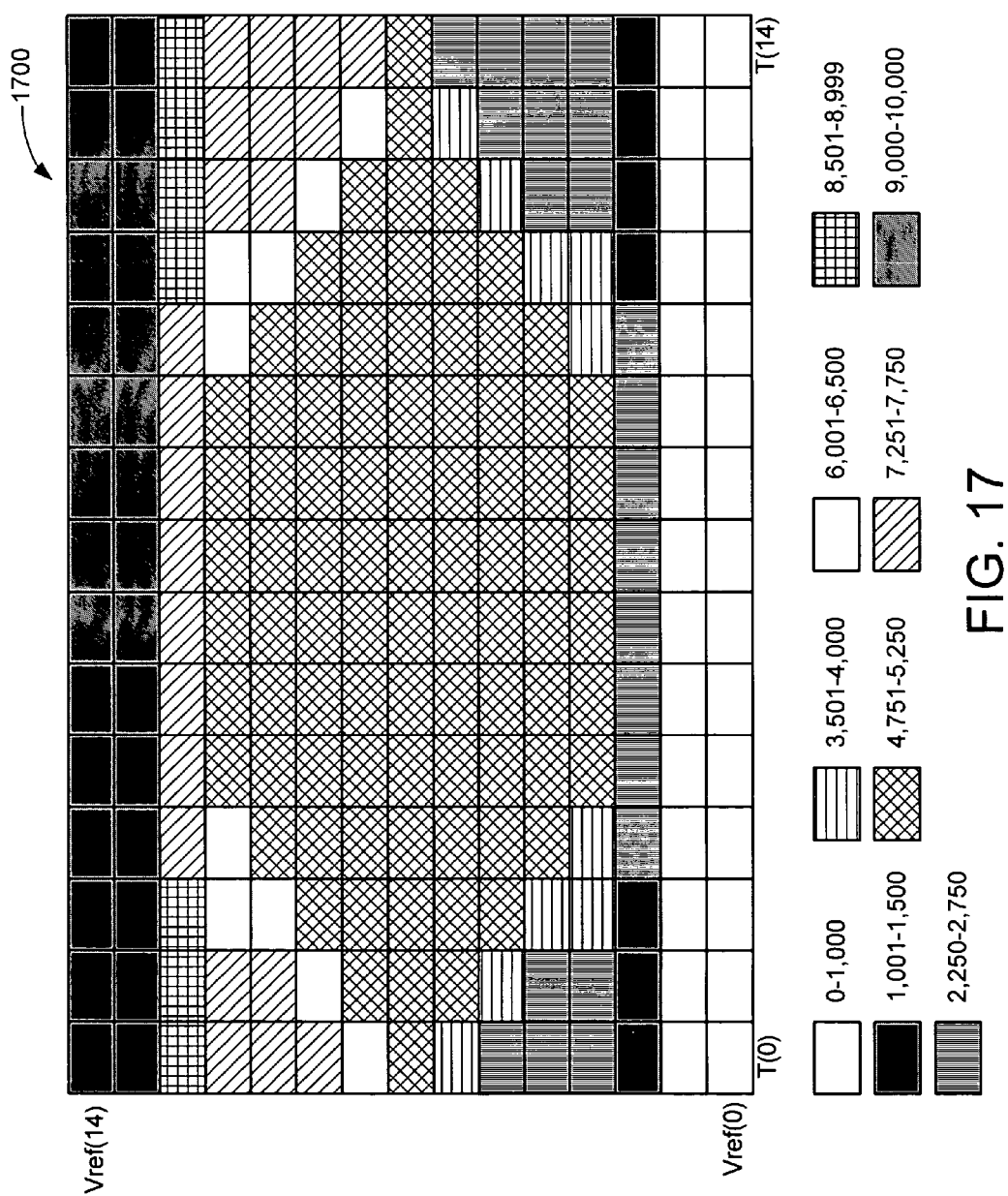
FIG. 17 is a table 1700 depicting the same data as table 1600 of FIG. 16 in a format that emphasizes how the data expresses a signal eye.

FIG. 17 is a table 1700 depicting the same data as table 1600 of FIG. 16 in a format that emphasizes how the data expresses a signal eye. Data points are grouped and shaded according to the number of sampled ones out of 10,000 samples. The disparate shading highlights characteristics of the hypothetical data eye representative of the sampled input data stream.

Figure 18:
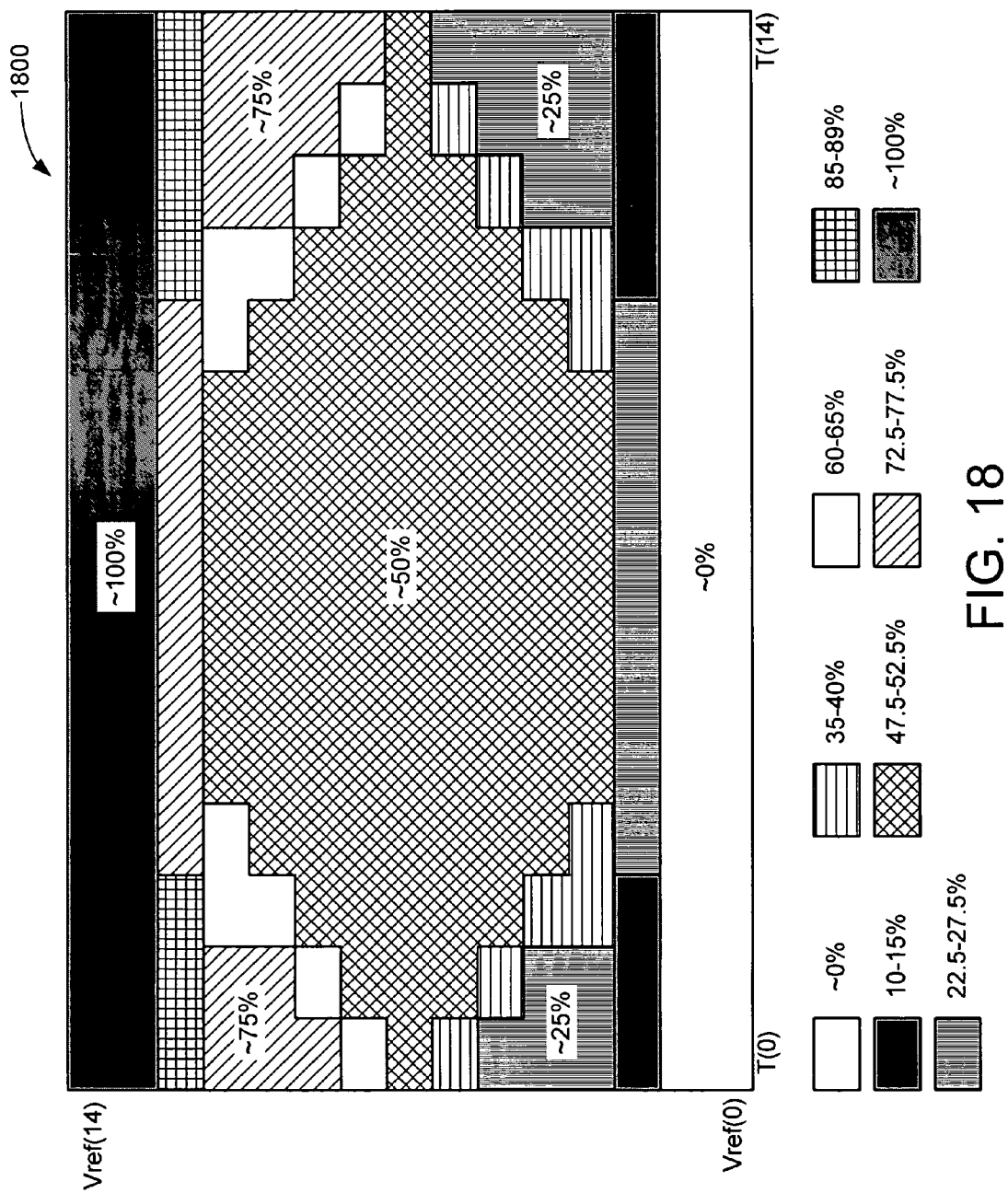
FIG. 18 is yet another table, this one labeled 1800, depicting the data of tables 1600 and 1700.

FIG. 18 is yet another table, this one labeled 1800, depicting the data of tables 1600 and 1700. Table 1800 differs from table 1700 in that data points with similar numbers of samples are collected and the fraction of sampled ones divided by ten thousand is depicted as a percentage, the approximate probability that data sampled in a given area in V/T space will be a logic one. A comparison of table 1800 with diagram 1500 of FIG. 15 shows how table 1800 illustrates a data eye similar to data eye 1505 using probability data.

The boundaries between areas of differing probability are fairly stark. Referring back to FIG. 18, for example, the probabilities of the data points within the depicted data eye differ from the ideal 50% by at most 2.5%, ranging from about 47.5% to about 52.5%, whereas the data points surrounding the eye differ from those probabilities by a minimum of about 7.5%. The boundaries defining the depicted data eye can therefore be highlighted by taking spatial (e.g., one- or two-dimensional) derivatives of the probability data to highlight points at which the probability changes significantly between adjacent data points. In one embodiment, for example, data of the type depicted in FIGS. 17 and 18 is represented as derivatives of that data taken along each time T(0) through T(14) to highlight the horizontal boundaries of FIGS. 17 and 18, as derivatives of that data taken along each voltage Vref(0) through Vref(14) to highlight the vertical boundaries, or both.

As noted above, the "data" of FIGS. 17 and 18 is merely illustrative. Real data may be much less evenly distributed and subject to significant variations due to noise. Increasing the number of samples acquired for each data point helps. Other embodiments include various well known methods of filtering, such as discarding "flyer" data values. Further, in the case of a small eye suffering from substantial ISI, jitter, and other noise sources, the statistically expected ones densities in the transition regions would not be as uniform as in the figures shown. However, the eye opening would still be statistically distinct because relatively uniform ones densities would still be achieved within the opening.

Figure 19:
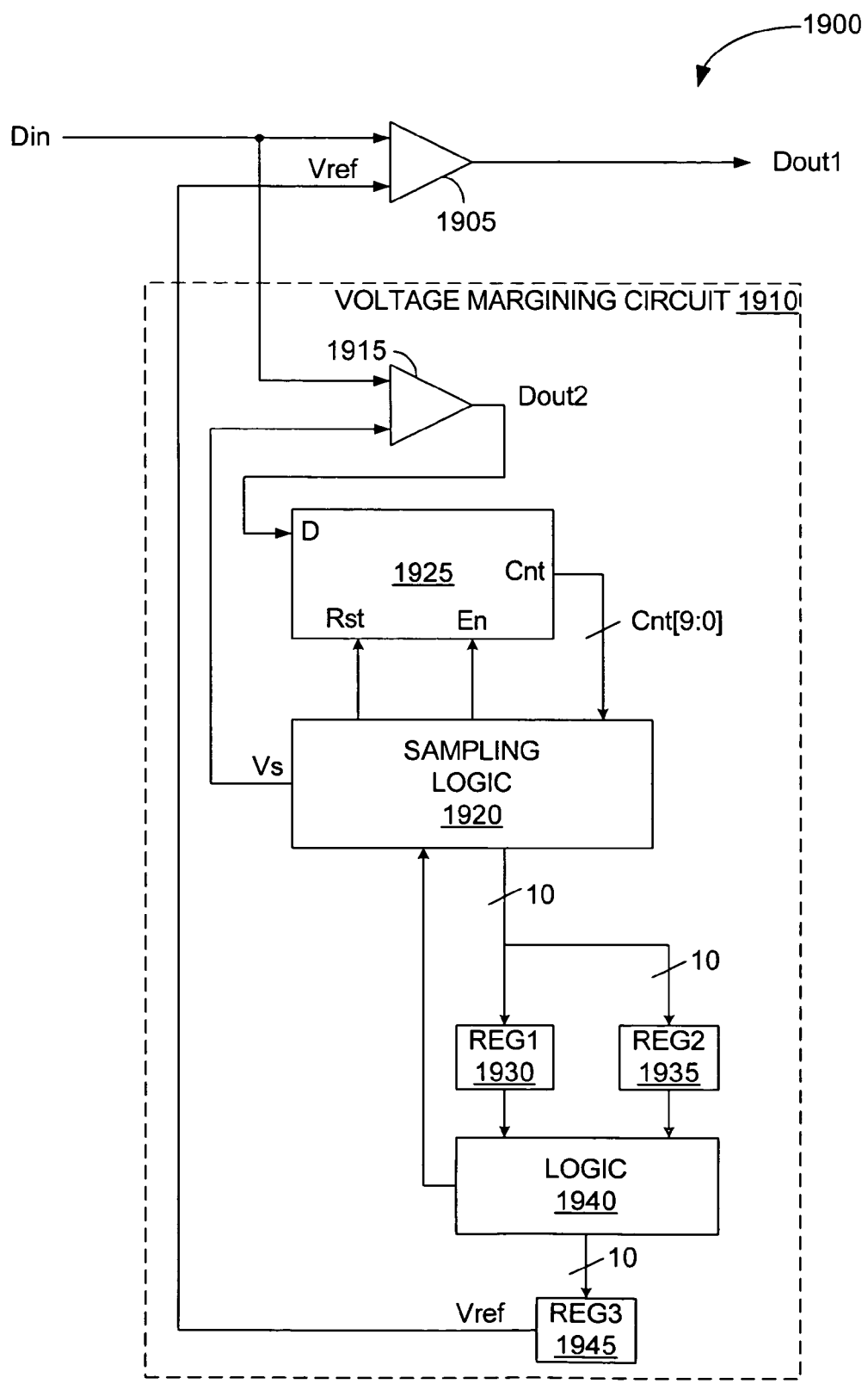
FIG. 19 depicts a system 1900 that includes a receiver 1905 and a margining circuit 1910 in accordance with another embodiment.

FIG. 19 depicts a system 1900 that includes a receiver 1905 and a margining circuit 1910 in accordance with another embodiment. Margining circuit 1910 uses a second receiver 1915, typically identical to receiver 1905, to find the center voltage and/or timing value of data eyes derived from incoming data Din. Margining circuit 1910 then sets the reference voltage Vref and/or timing of receiver 1905 at the center value to maximize the voltage and/or timing margin. Receivers 1905 and 1915 are samplers in one embodiment.

In operation, sampling logic 1920 sets a shmoo voltage Vs, the sampling voltage for receiver 1915, to the nominal voltage center (the expected center) of the incoming data stream. Sampling logic 1920 then resets a counter 1925 and enables counter 1925 to count the number of logic ones expressed as output data Dout2 from receiver 1915 over a statistically significant number N of input clock cycles (e.g., 10,000 clock cycles). As noted above in connection with FIG. 15, and assuming balanced input data, samples taken within the data eye have a 50% probability of being a logic one, give or take a margin of error. The margin of error will vary from system to system, and with the number of samples taken. This example assumes that data sampled within the eye will exhibit a ones probability of between 45% and 55%.

If the ones probability for the current sample point is between 45% and 55%, the current voltage setting is recorded in a first register 1930 and the sampling voltage Vs is incremented. The sampling process is then repeated for each incrementally greater sample voltage Vs until the measured ones probability is greater than 55%. The sample voltage Vs producing this relatively high ones probability is above the margin, so the voltage setting within register 1930 is not updated. Register 1930 thus contains an indication of the highest voltage Vs within the incoming data eye.

Having found the upper limit of the data eye, margining circuit 1910 performs a similar procedure to obtain the lower limit. Sampling logic 1920 sets sample voltage Vs back to the nominal center of the incoming data stream. Sampling logic 1920 then resets counter 1925 and enables counter 1925 to count the number of logic ones expressed as output data Dout2 from receiver 1915 over N cycles. If the ones probability for the current sample point is between 45% and 55%, the current voltage setting for sample voltage Vs is recorded in a second register 1935 and sampling voltage Vs is decremented. The sampling process is then repeated for each decrementally lower sample voltage Vs until the measured ones probability is less than 45%. The sample voltage Vs producing this relatively low ones probability is below the margin, so the voltage setting within register 1935 is not updated. Register 1935 thus contains an indication of the lowest voltage Vs within the incoming data eye.

Some simple logic 1940 averages the values in registers 1930 and 1935 and stores the result in a third register 1945. The value in register 1945 represents the reference voltage Vref centered in the data eye and is used to set the reference voltage Vref applied to receiver 1905. This process can be carried out once, e.g. at start up, or repeated periodically to account for changes in the noise environment.

In some embodiments, margining circuit 1910 repeats the sampling for various timing instants along the X axis at a common voltage Vref to find the horizontal center of the data eye. As in the example of FIG. 15, the probability data remains the same all along the center of the data eye and into the preceding and subsequent data eyes. The values Vref for the horizontal margining is therefore selected to be above or below the central reference-voltage value indicated in register 1945. This embodiment does not provide the shmoo data for a complete shmoo plot, but can be implemented using relatively few resources. Other embodiments employ this or a similar method for in-situ or dynamic margining, and also support more data-intensive margining techniques for more detailed analysis. Redundant receivers employing these techniques can dynamically or periodically explore the boundaries of incoming data eyes to maintain the margin for an associated receiver.

In other embodiments, receiver 1915 within voltage margining circuit 1910 acts as the data receiver in normal operation. Margining circuit 1910 might also be shared among a number of receive amplifiers and used alternately to test each one. The margined receiver or receivers need not be samplers, but can be any form of data receivers.

Figure 20:
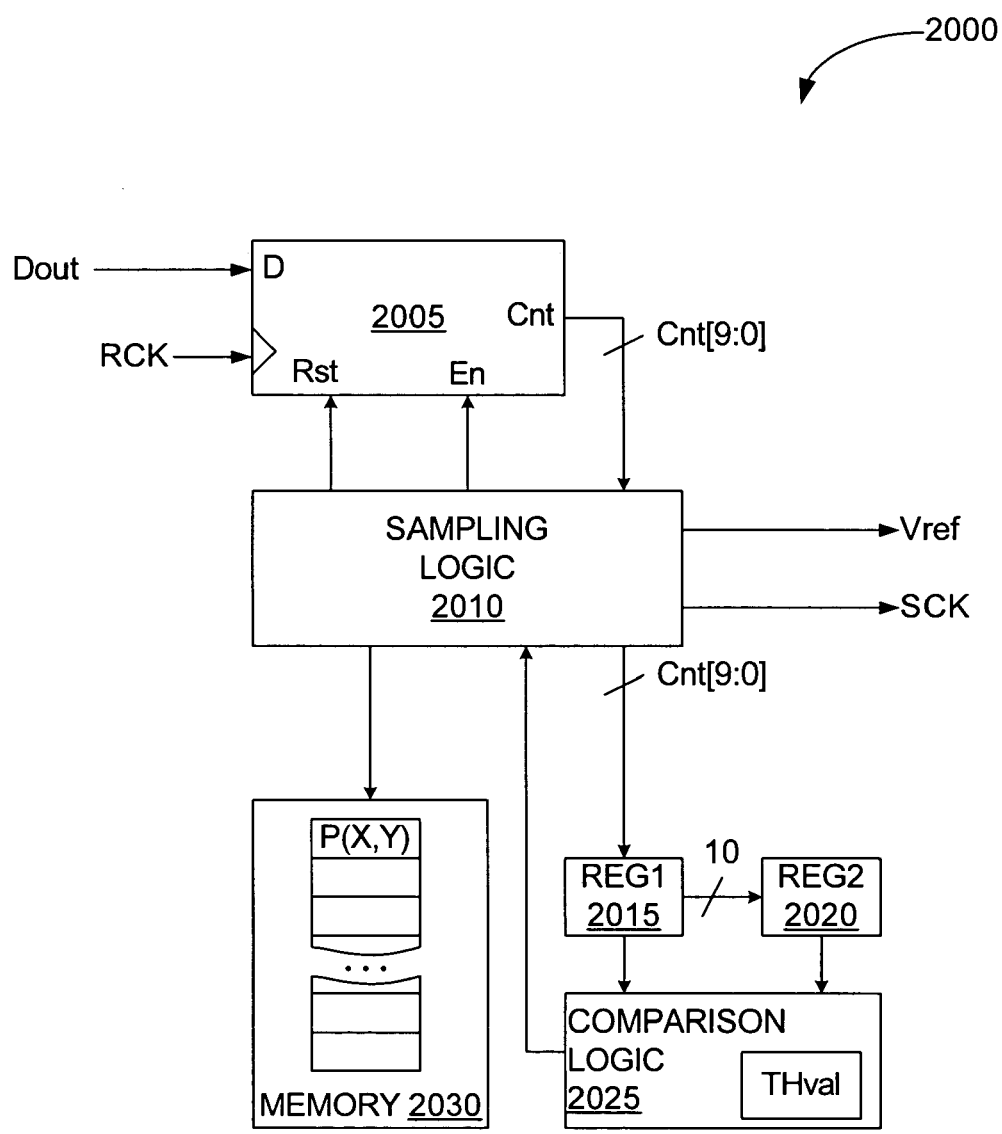
FIG. 20 depicts a margining circuit 2000 used in place of margining circuit 1410 of FIG. 14 in another embodiment.

FIG. 20 depicts a margining circuit 2000 used in place of margining circuit 1410 of FIG. 14 in another embodiment. Margining circuit 2000 samples output data Dout in much the same way as margining circuit 1410, but plots the resulting probability data as the difference between the probabilities of sample points that are adjacent on the voltage axis. The operation of an embodiment of margining circuit 2000 is described below in connection with FIG. 21.

Margining circuit 2000 includes a conventional counter 2005, sampling logic 2010, first and second registers 2015 and 2020, comparison logic 2025, and some memory 2030 that may be on the same or a different integrated circuit with the rest of circuit 2000.

Figure 21:
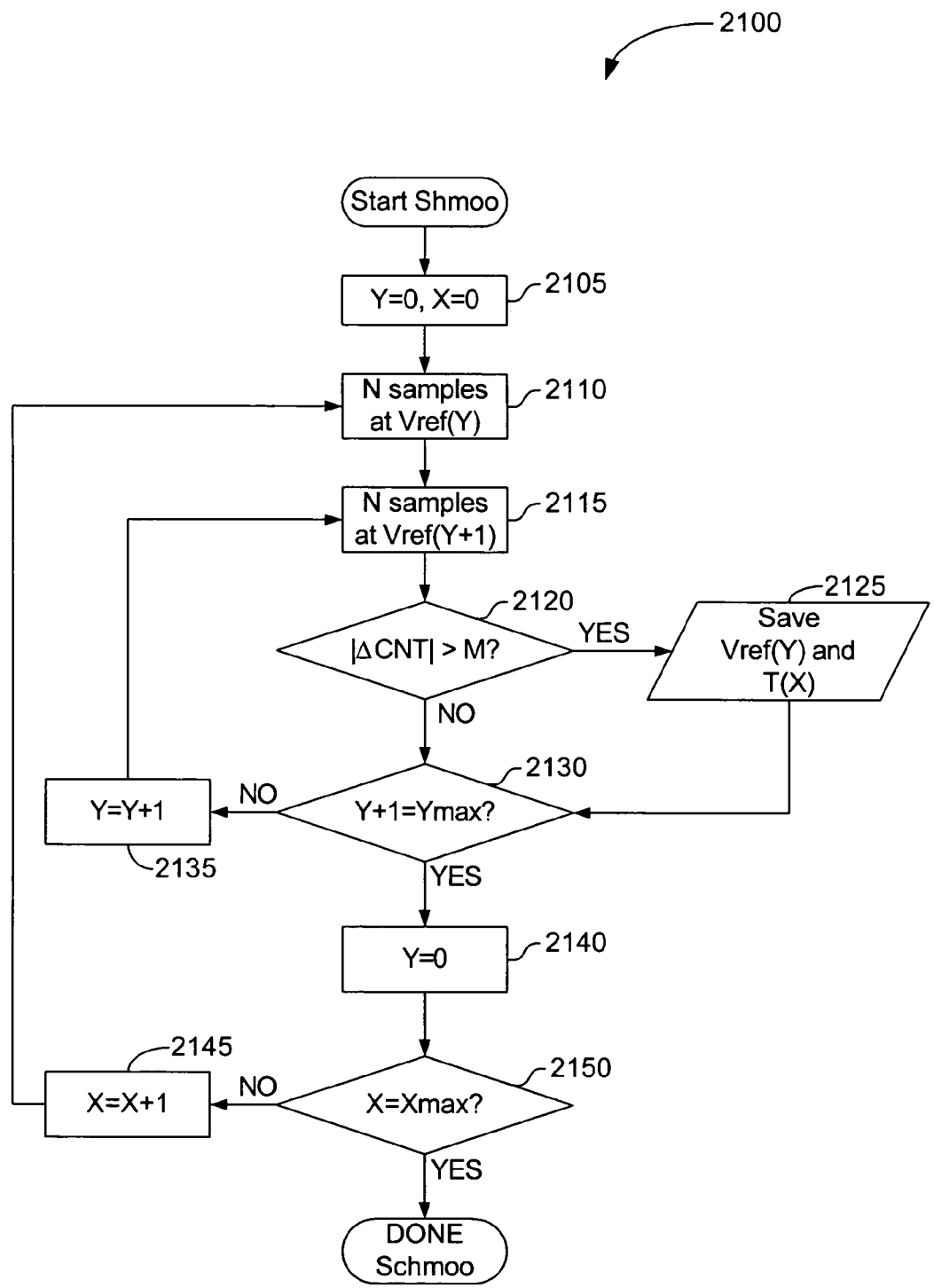
FIG. 21 is a flowchart 2100 illustrating the functionality of margining circuit 2000 of FIG. 20 in accordance with one embodiment.

FIG. 21 is a flowchart 2100 illustrating the functionality of margining circuit 2000 of FIG. 20 in accordance with one embodiment. Beginning at step 2105, sampling logic 2010 resets counter 2005 and a pair of X and Y counters (not shown) to zero. The X and Y counters together specify data points of the type depicted in FIG. 18, where Y specifies values along the Y (voltage) axis and X specifies values along the X (time) axis. Next, sampling logic 2010 enables counter 2005 for N sample periods, ten thousand received clock cycles in the forgoing embodiments, during which time counter 2005 accumulates the number of sampled ones (step 2110). The final count, in this case corresponding to data point P[0,0], is then stored in the first register 2015. The Y register is then incremented and the sampling repeated for the next reference voltage Vref(Y+1). The resulting count is once again stored in register 2015 and the contents of register 2015 is shifted into register 2020 (step 2115).

At this point, registers 2015 and 2020 contain probability data for adjacent sample points along the voltage axis. Comparison logic 2025 then compares the difference between the probabilities represented in registers 2015 and 2020 against a threshold value THval (decision 2120). If the difference exceeds value THval, sampling logic 2010 stores the X and Y coordinate values in memory 2030 (step 2125). In the example of FIGS. 18 and 19, for example, differences greater than 5% may be assumed to represent signal trace edges. Comparison logic 2025 indicates whether the difference is positive or negative in some embodiments, and the threshold value can be adjusted or omitted as desired.

Turning to decision 2130, if Y+1 is less than Ymax, the highest numbered sample reference voltage, sampling logic 2010 increments the Y value (step 2135) and repeats the sampling and comparison steps for the next sample point on the Y axis. This process continues for each reference voltage Vref. Once all data points have been explored for a given X (sample timing) value, Y is reset to zero (step 2140) and X is incremented (step 2145), provided X is less than the highest available X value (decision 2150). Sampling logic 2010 is finished when probability data has been derived for each sample point along the X and Y axes. This process thus saves all the coordinates that produced a change in the ones probability greater than the threshold value THval. The points typically indicate the trajectories of the signal traces through the V/T space.

Figure 22:
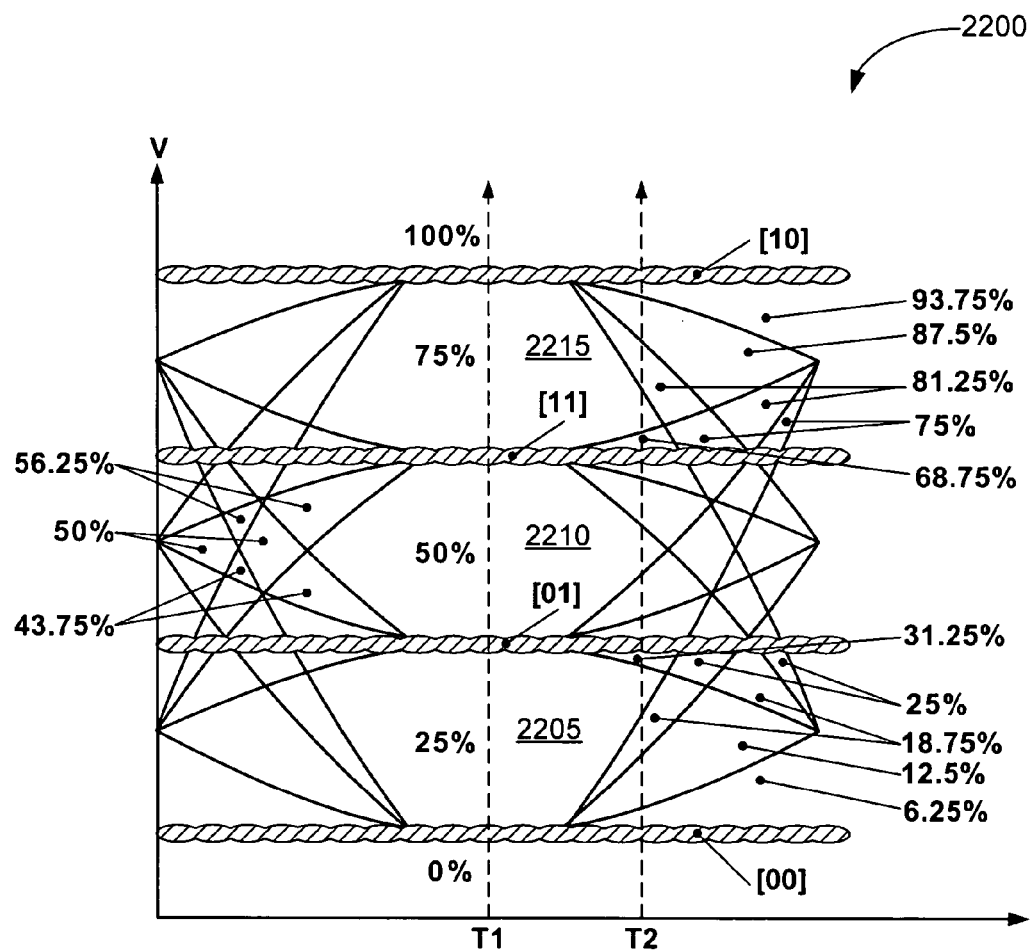
FIG. 22 is an eye diagram 2200 illustrative of a 4-PAM signal, and is included here to show that the methods and circuits described herein are applicable to different signaling schemes.

FIG. 22 is an eye diagram 2200 illustrative of a 4-PAM signal, and is included here to show that the methods and circuits described herein are applicable to different signaling schemes. As is well known, 4-PAM signaling schemes represent data using four data levels (i.e., four data symbols), each of which is represented in FIG. 22 as a cross-hatched horizontal line labeled using the digital bits the voltage level is intended to represent. The example assumes a 4-PAM signaling scheme expressing equal numbers of the four possible states over the sample period.

Diagram 2200 depicts a number of regions in the V/T space labeled using a ones probability expressed as a percentage (i.e., the percentage of ones sampled at points P[T,V] within the respective V/T region). Time T1 represents the ideal sampling instant centered in the three data eyes of the 4-PAM signal. Referring first to data eye 2205, data sampled within this eye has a one in four chance of being below the sampling point (i.e., the data must be 00 to be below the sampling point), so single-bit sampled data has a 25% ones probability. Data sampled within eye 2210 has an equal probability of being above (10 or 11) or below (01 or 00) the sample point, so data sampled within window 2210 will have a ones probability of 50%. Finally, data sampled within data eye 2215 has a three in four chance of being below the sampling point, and thus has a ones probability of 75%. Probability data can thus be used to distinguish the three main data eyes of a 4-PAM signal.

Various V/T regions surrounding eyes 2205, 2210, and 2215 are also labeled using ones probabilities. These probabilities stem from the fact that the expressed data has sixteen possible states during periods of transition (e.g., at time T2). The number is sixteen because, during the transition times, the expressed data can either be remaining the same or transitioning to one of the three other states. As an illustrative example, the V/T region directly to the right of data eye 2215 is labeled 81.25%. Of the sixteen possible states at time T2, three are above the sample points within the V/T region and thirteen are below. The ones probability is therefore $13/16$, or 81.25%.

Diagram 2200 is more complex than diagram 1800 of FIG. 15, but probabilistic data can be used in the same manner to analyze the 4-PAM data. Some embodiments are adapted to analyzes data sampled in V/T space to distinguish between signaling schemes (e.g., 2-PAM v. 4-PAM).

Each of the above examples assumes balanced input signals (e.g. equal numbers of ones and zeros for 2-PAM signals, or an equal number of zeros, ones, twos, and threes in 4-PAM signals). The embodiments described herein also work for unbalanced signals, provided sufficient numbers of samples are taken at each point. If a given signaling scheme uses more ones than zeroes over time, plots like those of FIGS. 17 and 18 show different probabilities in the highlighted areas, but the various V/T regions still show up as "flat" areas, i.e., areas with relatively consistent ones probabilities. For example, the data taken at points within a 2-PAM data eye might not be closely grouped around 50% ones, but might instead be grouped around 60% ones. The boundaries of the eye would still be evident as a change in probabilities. The resulting probability data can be converted to and viewed as derivatives of the probabilities to clarify the boundaries between different eye features.

It is important to note in diagram 1500 that, assuming input data exhibiting an equal number of ones and zeroes, the 50% probability may extend horizontally outside of the central data eye. (The same is true of 2-PAM data of the type discussed above.) Care should therefore be taken, when centering the sample point within a given data eye, to distinguish the boundaries of the correct eye opening from other areas that exhibit similar probabilities.

The foregoing embodiments offer many advantages. Among them, the analysis may be based upon the properties of an actual receiver or a close replica, thus avoiding errors that might otherwise be introduced by test equipment. The margining circuits and methods can be used to initially or periodically calibrate a receiver's sampling point, to adjust equalization coefficients, measure signal amplitude, measure signal timing, etc. Embodiments can be adapted to find and maintain optimized margins to support a sort of "plug-and-play" model for high-performance receivers.

Figure 23A:
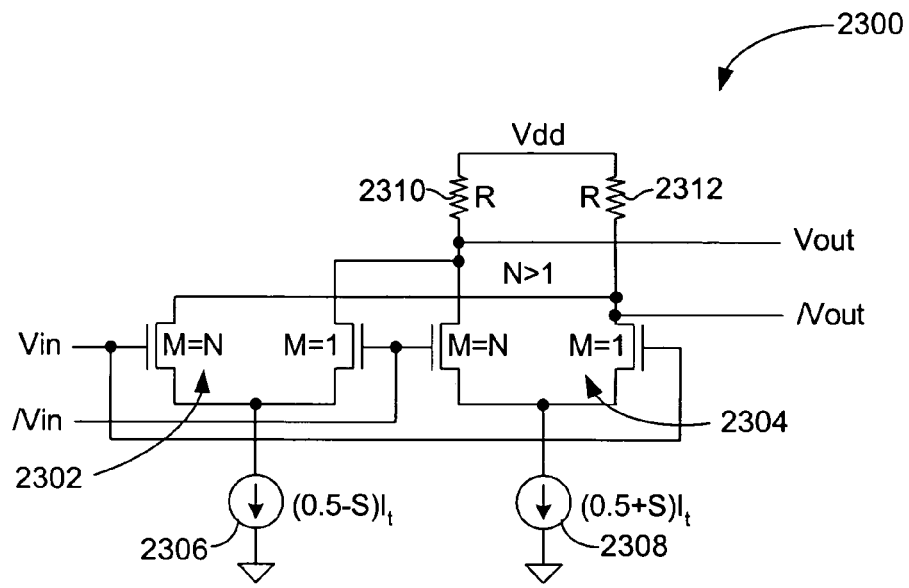
FIG. 23A (prior art) schematically depicts a conventional differential amplifier 2300 with substantially linear voltage-threshold control.

FIG. 23A schematically depicts a conventional differential amplifier 2300 with substantially linear voltage-threshold control. Amplifier 2300 is an example of one of many types of amplifiers, differential or otherwise, that can benefit from margining methods described herein. Amplifier 2300 provides substantially linear voltage-threshold control using two oppositely skewed differential pairs to drive a shared differential load.

Figure 23B:
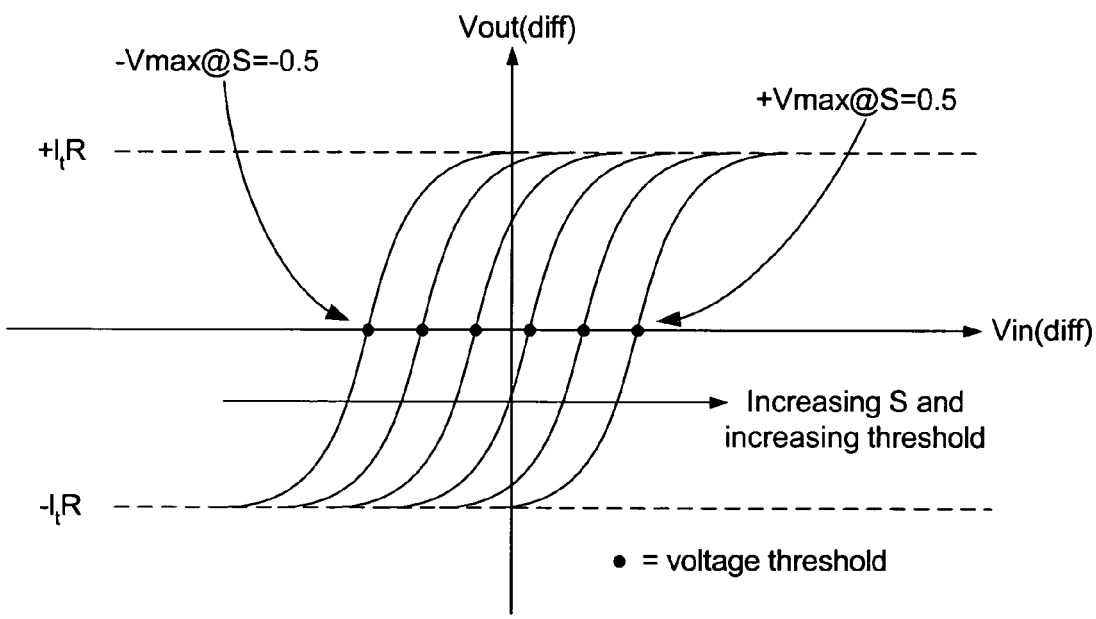
FIG. 23B (prior art) is a waveform diagram illustrating the effect of voltage-threshold adjustments on differential amplifier 2300 of FIG. 23A.

Differential amplifier 2300 includes a first differential transistor pair 2302, a second differential transistor pair 2304, a first current source 2306, a second current source 2308, a first load 2310 (i.e., resistance R), and a second load 2312 (i.e., resistance R), wherein M represents a normalized size of the transistors in the first 2302 and second 2304 differential transistor pairs, N represents a transistor size ratio variable, and S represents a current steering variable. By steering a fixed amount of tail current, It, between the first differential transistor pair 2302 and the second differential transistor pair 2304, the effective voltage threshold can be adjusted from +Vmax to −Vmax, where Vmax is the systematic offset voltage of each of the first differential transistor pair 2302 and the second differential transistor pair 2304, as shown in FIG. 23B, wherein Vin(diff) represents the differential signal formed of input signals Din and /Din and Vout(diff) represents the differential signal formed of output signals Dout and /Dout. This systematic offset voltage is due to the difference in size between the two transistors in each of the first differential transistor pair 2302 and the second differential transistor pair 2304. The magnitude of the systematic offset voltage for each differential transistor pair is approximately proportional to the square root of its tail current, $I_t$, and the square root of its transistor size ratio.

While the present invention has been described in connection with specific embodiments, variations of these embodiments will be obvious to those of ordinary skill in the art. Moreover, unless otherwise defined, terminals, lines, conductors, and traces that carry a given signal fall under the umbrella term "node." In general, the choice of a given description of a circuit node is a matter of style, and is not limiting. Likewise, the term "connected" is not limiting unless otherwise defined. Some components are shown directly connected to one another while others are shown connected via intermediate components. In each instance, the method of interconnection establishes some desired electrical communication between two or more circuit nodes, or terminals. Such communication may often be accomplished using a number of circuit configurations, as will be understood by those of skill in the art. Furthermore, only those claims specifically reciting "means for" or "step for" should be construed in the manner required under the sixth paragraph of 35 U.S.C. section 112. Therefore, the spirit and scope of the appended claims should not be limited to the foregoing description.

What is claimed is:

1. A method comprising:
   a. sampling a first series of input symbols using a first voltage threshold to produce a series of first sampled symbols, wherein each of the first sampled symbols represents one of a plurality of logic levels, including a first logic level and a second logic level;
   b. calculating a first probability that the first sampled symbols represent the first logic level;
   c. sampling a second series of input symbols using a second voltage threshold to produce a series of second sampled symbols, wherein each of the second sampled symbols represents one of the plurality of logic levels, including the first logic level and the second logic level; and
   d. calculating a second probability that the second sampled symbols represent the first logic level.

2. The method of claim 1, further comprising repeating (a) through (d) for each of N additional voltage thresholds.

3. The method of claim 1, further comprising repeating (a) through (d) for each of M sample phases.

4. The method of claim 3, further comprising rendering a margin diagram using probability data, including the first and second probabilities.

5. The method of claim 1, wherein the first logic level is representative of a logic zero and the second logic level is representative of a logic one.

6. The method of claim 1, wherein calculating the first probability comprises dividing the number of the first sampled symbols representing the first logic level by the total number of the first sampled data symbols.

7. The method of claim 1, further comprising comparing the first and second probabilities.

8. The method of claim 7, wherein the comparing comprises comparing the first probability with the second probability.

9. The method of claim 7, wherein the comparing comprises comparing the first probability with a threshold value and comparing the second probability with the threshold value.

10. The method of claim 7, further comprising adjusting a sample voltage threshold based on the comparing and sampling a third series of data symbols using the adjusted sample voltage threshold.

11. The method of claim 1, wherein the first and second series of data symbols are sampled at a clock phase, the method further comprising adjusting the clock phase in response to the comparing and sampling a third series of data symbols using the adjusted clock phase.

12. A system comprising:
   a. a data input terminal adapted to receive a series of data symbols;
   b. a voltage threshold terminal adapted to receive a range of voltage thresholds, including a first voltage threshold and a second voltage threshold;
   c. a sampler having a sampler input terminal coupled to the data input terminal, a sampler reference terminal coupled to the voltage threshold terminal, and a data output terminal; and
   d. a counter coupled to the data output terminal and adapted to store:
      i. a first count representing a first probability that the received data symbols captured using the first voltage threshold are of a data type; and
      ii. a second count representing a second probability that the received data symbols captured using the second voltage threshold are of the data type.

13. The system of claim 12, further comprising first and second registers coupled to the counter and storing the first and second counts, respectively.

14. The system of claim 13, further comprising control logic coupled to the counter and the voltage threshold terminal.

15. The system of claim 14, wherein the control logic enables the counter to count a number of received data symbols, and wherein the first probability is a fraction of the received data symbols captured using the first voltage threshold of the data type divided by the number of data symbols.

16. The system of claim 15, wherein the second probability is a second fraction of the received data symbols captured using the second voltage threshold of the data type divided by the number of data symbols.

17. The system of claim 12, further comprising a memory port coupled to an addressable memory.

18. The system of claim 17, wherein the addressable memory and the sampler are instantiated on an integrated circuit.

19. The system of claim 12, wherein the sampler comprises an amplifier and a decision circuit.

20. The system of claim 12, further comprising comparison logic comparing the first count to at least one of the second count or a threshold value.

21. The system of claim 20, wherein the comparison logic compares the difference between the first and second counts with the threshold value.

22. A receiver comprising:
   a. a data input terminal adapted to receive a series of data symbols;
   b. a voltage threshold terminal adapted to receive a plurality of voltage thresholds, including a first voltage threshold and a second voltage threshold;
   c. means for capturing at least some of the series of data symbols at the first voltage threshold;
   d. means for capturing at least some of the series of data symbols at the second voltage threshold;
   e. means for calculating a first probability that the received data symbols captured using the first voltage threshold are of a data type; and
   f. means for calculating a second probability that the received data symbols captured using the second voltage threshold are of the data type.

23. The receiver of claim 22, further comprising means for comparing the first and second probabilities.

24. The receiver of claim 22, wherein the series of data symbols form a data eye, the receiver further comprising means for probing boundaries of the eye using the first and second probabilities.

* * * * *

UNITED STATES PATENT AND TRADEMARK OFFICE
CERTIFICATE OF CORRECTION

| | | |
|---|---|---|
| PATENT NO. | : 7,336,749 B2 | Page 1 of 1 |
| APPLICATION NO. | : 10/849264 | |
| DATED | : February 26, 2008 | |
| INVENTOR(S) | : Bruno W. Garlepp | |

It is certified that error appears in the above-identified patent and that said Letters Patent is hereby corrected as shown below:

Column 8, Line 28 the word "the" should be changed to --of--
Column 13, Line 58 the word "a" should be changed to --an--
Column 15, Line 41 the word "for" should be changed to --four--
Column 19, Line 54 the word "analyzes" should be changed to --analyze--

Signed and Sealed this

Twenty-ninth Day of July, 2008

JON W. DUDAS
*Director of the United States Patent and Trademark Office*